(12) United States Patent
Joseph Durairaj et al.

(10) Patent No.: US 10,462,169 B2
(45) Date of Patent: Oct. 29, 2019

(54) LATERAL MOVEMENT DETECTION THROUGH GRAPH-BASED CANDIDATE SELECTION

(71) Applicant: Splunk Inc., San Francisco, CA (US)

(72) Inventors: Satheesh Kumar Joseph Durairaj, Dublin, CA (US); Stanislav Miskovic, San Jose, CA (US); Georgios Apostolopoulos, San Jose, CA (US)

(73) Assignee: SPLUNK INC., San Francisco, CA (US)

( * ) Notice: Subject to any disclaimer, the term of this patent is extended or adjusted under 35 U.S.C. 154(b) by 175 days.

(21) Appl. No.: 15/582,645

(22) Filed: Apr. 29, 2017

(65) Prior Publication Data

US 2018/0316704 A1 Nov. 1, 2018

(51) Int. Cl.
| | | |
|---|---|---|
| *G08B 23/00* | (2006.01) | |
| *G06F 12/16* | (2006.01) | |
| *G06F 12/14* | (2006.01) | |
| *G06F 11/00* | (2006.01) | |
| *H04L 29/06* | (2006.01) | |
| *G06N 20/00* | (2019.01) | |
| *G06F 16/901* | (2019.01) | |

(52) U.S. Cl.
CPC ...... *H04L 63/1425* (2013.01); *G06F 16/9024* (2019.01); *G06N 20/00* (2019.01)

(58) Field of Classification Search
CPC ... H04L 63/1425; H04L 63/02; H04L 63/101; H04L 63/105; H04L 63/1466; G06F 17/30958; G06N 99/005
USPC ......................................................... 726/23
See application file for complete search history.

(56) References Cited

U.S. PATENT DOCUMENTS

| | | | | |
|---|---|---|---|---|
| 9,516,053 | B1* | 12/2016 | Muddu | ............... H04L 63/1425 |
| 2013/0198840 | A1* | 8/2013 | Drissi | ..................... G06F 21/55 |
| | | | | 726/22 |
| 2016/0065601 | A1* | 3/2016 | Gong | .................... G06F 21/561 |
| | | | | 726/23 |
| 2016/0078229 | A1* | 3/2016 | Gong | .................... G06F 21/577 |
| | | | | 726/24 |
| 2016/0088000 | A1* | 3/2016 | Siva Kumar | ........ H04L 63/083 |
| | | | | 726/23 |
| 2016/0308884 | A1* | 10/2016 | Kent | .................... G06K 9/6277 |
| 2017/0063911 | A1* | 3/2017 | Muddu | ............... H04L 63/1425 |

(Continued)

OTHER PUBLICATIONS

Guisong Liu; A hierarchical intrusion detection model based on the PCA neural networks; Neurocomputing 70 (2007) 1561-1568 (Year: 2007).*

*Primary Examiner* — Monjur Rahim
(74) *Attorney, Agent, or Firm* — Perkins Coie LLP

(57) ABSTRACT

A lateral movement application identifies lateral movement (LM) candidates that potentially represent a security threat. Security platforms generate event data when performing security-related functions, such as authenticating a user account. The disclosed technology enables greatly increased accuracy identification of lateral movement (LM) candidates by, for example, refining a population of LM candidates based on an analysis of a time constrained graph in which nodes represent entities, and edges between nodes represent a time sequence of login or other association activities between the entities. The graph is created based on an analysis of the event data, including time sequences of the event data.

28 Claims, 18 Drawing Sheets

(56) References Cited

U.S. PATENT DOCUMENTS

| | | | |
|---|---|---|---|
| 2017/0126717 A1* | 5/2017 | Siva Kumar | H04L 63/083 |
| 2017/0223046 A1* | 8/2017 | Singh | H04L 43/062 |
| 2018/0004941 A1* | 1/2018 | Reinecke | G06F 21/55 |
| 2018/0219879 A1* | 8/2018 | Pierce | H04L 63/1416 |

* cited by examiner

| Date and Time | Source | Event ID | Task Category |
|---|---|---|---|
| 1/19/2017 8:11:36 PM | Microsoft Windows security auditing. | 4656 | Other Object Access Events |
| 1/19/2017 8:11:36 PM | Microsoft Windows security auditing. | 4624 | Logon |
| 1/19/2017 8:11:36 PM | Microsoft Windows security auditing. | 4672 | Special Logon |
| 1/19/2017 8:11:07 PM | Microsoft Windows security auditing. | 4662 | Other Object Access Events |
| 1/19/2017 8:09:19 PM | Microsoft Windows security auditing. | 4689 | Process Termination |
| 1/19/2017 8:08:33 PM | Microsoft Windows security auditing. | 4656 | Other Object Access Events |
| 1/19/2017 8:08:33 PM | Microsoft Windows security auditing. | 4688 | Process Creation |
| 1/19/2017 8:07:46 PM | Microsoft Windows security auditing. | 4688 | Process Creation |
| 1/19/2017 8:07:46 PM | Microsoft Windows security auditing. | 4688 | Process Creation |
| 1/19/2017 8:07:31 PM | Eventlog | 1102 | Log Clear |

*FIG. 8B*

Event 4624, Microsoft Windows security auditing.

General | Details

An account was successfully logged on.

Subject:
    Security ID:          NULL SID
    Account Name:      -
    Account Domain:    -
    Logon ID:            0x0

Logon Type:             3

New Logon:
    Security ID:          5-1-5-21-1428927658-4111424224-703010071-500
    Account Name:      Administrator
    Account Domain:    DCSYPHON
    Logon ID:            0x21fb57
    Logon GUID:        (2f868175-be62-549f-c16c-dd7a0f78bf7a)

Process Information:
    Process ID:          0x0
    Process Name:      -

Network Information:
    Workstation Name:
    Source Network Address:  -
    Source Port:          -

Detailed Authentication Information:
    Logon Process:       Kerberos
    Authentication Package:  Kerberos
    Transited Services:    -
    Package Name (NTLM only):  -

| | | | |
|---|---|---|---|
| Log Name: | Security | | |
| Source: | Microsoft Window | Logged: | 1/19/2017 8:11:36 PM |
| Event: | 4624 | Task Category: | Logon |
| Level: | Information | Keywords: | Audit Success |
| User: | N/A | Computer: | win7carder.dcsyphon.local |
| OpCode: | Info | | |
| More Information: | Event Log Online | | |

*FIG. 8C*

| Date and Time | Source | Event ID | Task Category |
|---|---|---|---|
| 1/19/2017 8:11:36 PM | Microsoft Windows security auditing. | 4656 | Other Object Access Events |
| 1/19/2017 8:11:36 PM | Microsoft Windows security auditing. | 4624 | Logon |
| 1/19/2017 8:11:36 PM | Microsoft Windows security auditing. | 4672 | Special Logon |
| 1/19/2017 8:11:07 PM | Microsoft Windows security auditing. | 4662 | Other Object Access Events |
| 1/19/2017 8:09:19 PM | Microsoft Windows security auditing. | 4689 | Process Termination |
| 1/19/2017 8:08:33 PM | Microsoft Windows security auditing. | 4656 | Other Object Access Events |
| 1/19/2017 8:08:33 PM | Microsoft Windows security auditing. | 4688 | Process Creation |
| 1/19/2017 8:07:46 PM | Microsoft Windows security auditing. | 4688 | Process Creation |
| 1/19/2017 8:07:46 PM | Microsoft Windows security auditing. | 4688 | Process Creation |
| 1/19/2017 8:07:31 PM | Eventlog | 1102 | Log Clear |

*FIG. 9B*

Event 4672, Microsoft Windows security auditing.

General | Details

Special privileges assigned to new logon.

Subject:
    Security ID:          5-1-5-21-1428927658-4111424224-703010071-500
    Account Name:     Administrator
    Account Domain:   DCSYPHON
    Logon ID:           0x21fb57

Privileges:       SeSecurityPrivilege
                    SeImpersonatePrivilege
                    SeBackupPrivilege
                    SeRestorePrivilege
                    SeTakeOwnershipPrivilege
                    SeDebugPrivilege
                    SeSystemEnvironmentPrivilege
                    SeLoadDriverPrivilege
                    SeEnableDelegationPrivilege Log Name:     Security
Source:        Microsoft Window    Logged:         1/19/2017 8:11:36 PM
Event:         4672                      Task Category: Special Logon
Level:          Information           Keywords:      Audit Success
User:          N/A                        Computer:      win7carder.dcsyphon.local
OpCode:       Info
More Information:   Event Log Online

*FIG. 9C*

| Date and Time | Source | Event ID | Task Category |
|---|---|---|---|
| 1/19/2017 8:11:36 PM | Microsoft Windows security auditing. | 4656 | Other Object Access Events |
| 1/19/2017 8:11:36 PM | Microsoft Windows security auditing. | 4624 | Logon |
| 1/19/2017 8:11:36 PM | Microsoft Windows security auditing. | 4672 | Special Logon |
| 1/19/2017 8:11:07 PM | Microsoft Windows security auditing. | 4662 | Other Object Access Events |
| 1/19/2017 8:09:19 PM | Microsoft Windows security auditing. | 4689 | Process Termination |
| 1/19/2017 8:08:33 PM | Microsoft Windows security auditing. | 4656 | Other Object Access Events |
| 1/19/2017 8:08:33 PM | Microsoft Windows security auditing. | 4688 | Process Creation |
| 1/19/2017 8:07:46 PM | Microsoft Windows security auditing. | 4688 | Process Creation |
| 1/19/2017 8:07:46 PM | Microsoft Windows security auditing. | 4688 | Process Creation |
| 1/19/2017 8:07:31 PM | Eventlog | 1102 | Log Clear |

*FIG. 10B*

Event 4688, Microsoft Windows security auditing.

| General | Details |

A new process has been created.

Subject:
   Security ID:         5-1-5-21-1428927658-4111424224-703010071-500
   Account Name:    Administrator
   Account Domain:  DCSYPHON
   Logon ID:          0xc7ec9

Process Information:
   New Process ID:     0x8c4
   New Process Name:  C:\Users\administrator\AppData\Local\Microsoft\Windows\Temporary Internet Files\Content.IE5\KKLS0E72\sateesh.exe
   Token Elevation Type: TokenElevationTypeDefault(1)
   Creator Process ID:   0xd1c Token Elevation Type indicates the type of token that was assigned to the new process in accordance with User Account Control policy.

Type 1 is a full token with no privileges removed or groups disabled. A full token is only used if User Account Control is disabled or if the user is the built-in Administrator account or a service account.

Type 2 is an elevated token with no privileges removed or groups disabled. An elevated token is used when User Account Control is enabled and the user chooses to start the program using Run as administrator. An elevated token is also used when an application is configured to always require administrative privilege or to always require maximum privilege, and the user is a member of the Administrators group.

Type 3 is a limited token with administrative privileges removed and administrative groups disabled. The limited token is used when User Account Control is enabled, the application does not require administrative privilege, and the user does not choose to start the program using Run as administrator.

Log Name:       Security
Source:         Microsoft Window   Logged:        1/19/2017 8:08:33 PM
Event:         4688               Task Category:  Process Creation
Level:          Information       Keywords:      Audit Success
User:          N/A                Computer:      win7carder.dcsyphon.local
OpCode:       Info
More Information:  Event Log Online

*FIG. 10C*

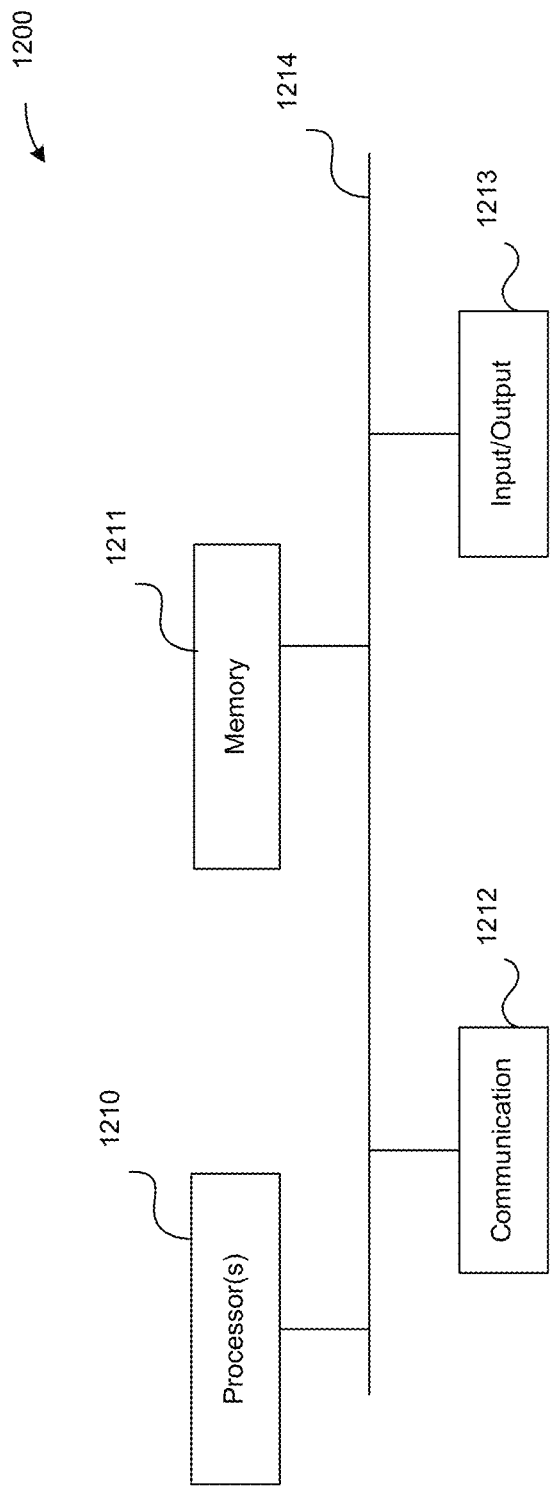

LATERAL MOVEMENT DETECTION THROUGH GRAPH-BASED CANDIDATE SELECTION

BACKGROUND

Activity detection, both friendly and malicious, has long been a priority for computer network administrators. In known public and private computer networks, users employ devices such as desktop computers, laptop computers, tablets, smart phones, browsers, etc. to interact with others through computers, servers, or other devices that are coupled to the network. Digital data, typically in the form of data packets, are passed along the network by interconnected network devices.

Unfortunately, however, malicious activities can cause harm to the network's software or hardware, or its users. Malicious activities may include unauthorized access or subsequent unpermitted use of network resources and data. Network administrators seek to detect such activities, for example, by searching for patterns of behavior that are abnormal or otherwise vary from the expected use pattern of a particular entity, such as an organization or subset thereof, individual user, Internet Protocol (IP) address, node or group of nodes in the network, etc.

Security appliances, which are a type of security platform, are used in known systems to provide network security. The appliance approach involves installing security appliances (which are typically servers or computers configured for providing security) at one or more locations in the network. Once installed, the appliance monitors traffic that traverses the network. Functions provided by the appliance may include malware detection, intrusion detection, unauthorized access or unauthorized use of data, among others. Unfortunately, security appliances cannot easily be scaled to handle temporary or permanent increases in network traffic. Increased network traffic often requires a security vendor to perform an appliance swap or an equally time-consuming appliance upgrade. Appliances also tend to have only limited network visibility because they are typically configured to monitor data traversing the link on which a respective appliance is installed only. Such an appliance will be unaware of activities occurring on other network segments monitored by other appliances and thus cannot use the additional context information pertaining to activities occurring on other network segments to detect a cleverly-designed piece of malware that may be difficult to detect from purely localized information.

Installed software products, rather than security hardware appliances, provide another approach to security for data networks. These products, such as anti-virus or anti-malware software, typically are installed on terminal devices (e.g., desktop and laptop computers, tablets, or smart phones). Data traversing the network between the terminal device is monitored by the installed products to detect malware in either inbound or outbound data. Unfortunately, installed software products also do not perform well in terms of scalability or network visibility. Installed products tend to be disposed locally on the terminal devices and thus also tend to have fairly localized views of the data on the network. They also tend to be installed on hardware that cannot be upgraded easily.

BRIEF DESCRIPTION OF THE DRAWINGS

The disclosed technology will be better understood from a reading of the following detailed description, taken in conjunction with the accompanying drawing figures in which like reference characters designate like elements.

FIG. 8B illustrates a first portion of the example of FIG. 8A.

FIG. 8C illustrates a second portion of the example of FIG. 8A.

FIG. 9B illustrates a first portion of the example of FIG. 9A.

FIG. 9C illustrates a second portion of the example of FIG. 9A.

FIG. 10B illustrates a first portion of the example of FIG. 10A.

FIG. 10C illustrates a second portion of the example of FIG. 10A.

FIG. 12 is a system block diagram illustrating a computer system in which at least some operations described herein can be implemented.

DETAILED DESCRIPTION

Figure 1:
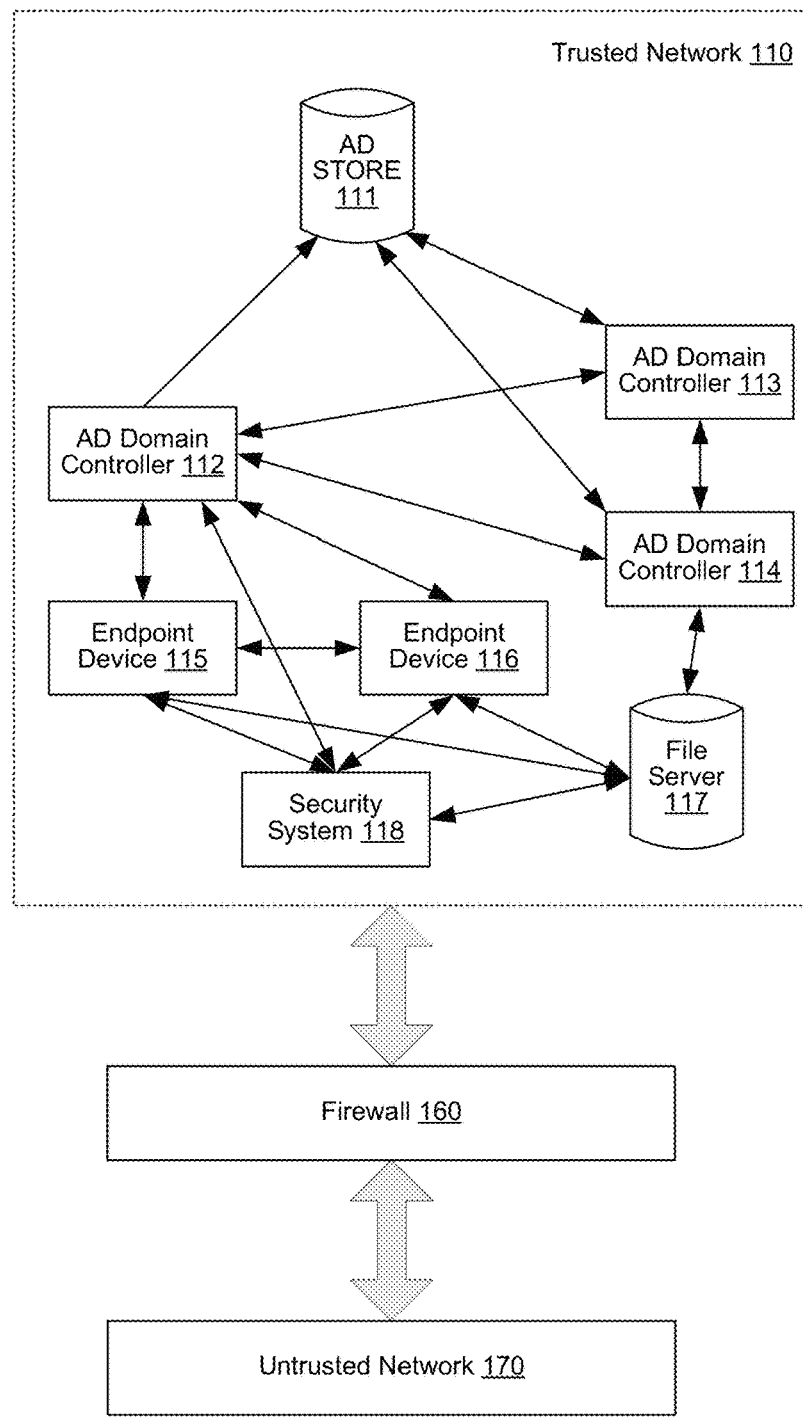
FIG. 1 illustrates the configuration of a network environment 100.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here is technology related to detecting lateral movement (referred to herein as "LM") candidates that indicate a potential network security threat. Cyberattacks generally combine vulnerabilities present at different devices in a network to compromise a critical network resource. To detect increasingly more sophisticated attacks on computer networks, it is advantageous to understand the internals of various security platforms, such as Active Directory (referred to herein as "AD"), in order to obtain "big picture" views of the attacks. AD is a network directory service that provides a broad range of directory-based identity-related services, such as authenticating and authorizing all users and computers in a Windows domain type network, assigning and enforcing security policies for all computers and installing or updating software.

One of the challenges in obtaining a "big picture" view is the scale of the problem. As the number of network devices grows and the complexity of device operations increases, it is increasingly more difficult to correlate actions of attackers across network devices, especially when the attackers mask themselves behind different user names or system privileges.

The technology disclosed here enables improved detection of attackers who move through a network via a LM attack strategy. LM refers to a network activity in which a user, who may be an attacker, progressively gains access to an increasing amount of resources inside a networked infrastructure, which is a situation that may be (but is not necessarily) indicative of a security threat. In other words, LM is indicative of a potential network security threat. The disclosed technology leverages event data to detect LM candidates, which are entities that indicate or are associated with LM. "Event data" is a discrete set of raw machine data that represents or corresponds to specific network activity, such as data generated by security platform(s) of a network when performing a security-related function, among others. The specific network activity is also referred to as an "event" or "events." Event data can be generated, e.g., when a security platform facilitates or tracks a network-related event, such as a login, a privilege elevation, an object access, etc. Various security platforms generate event data, and store the event data in a log file or stream the event data to other platform(s) or application(s) for real-time analysis.

Making effective use of event data to identify LM candidates is challenging. For example, event data can be associated with activities, e.g., interactions between AD Objects and Security Principles. The activities can be fine grained. For example, AD communication can be divided into objects and security principles. In an example, AD objects represent physical entities that make up a network and Security Principles represent any entity that can be authenticated by a system, such as user account, a computer account, or a thread or process that runs in the security context of a user or computer account. When interactions happen between objects and principles, communications are further broken down into multiple events, resulting in finer granularity event data. At such levels of granularity, it is often impossible to comprehend a big picture of activities happening in a network, such as actual malicious LM. It is also rarely possible to understand the roles of machines that reported events (examples of roles being: source of the activity, destination of the activity, a domain controller machine, etc.).

Current state-of-the-art in AD security analysis focuses on tracking per-event or per-event-parameter phenomena. Moreover, state-of-the-art analysis relies on information coming from various sources. For example, whenever an event, a token in an event, a collection of events, etc. are discovered, it/they can be tracked and used as an indicator of a particular type of exploit. Therefore, it is usually very difficult to make effective use of event data to characterize, and even observe, activities like logins (including direct logins, remote desktop protocol (RDP) logins), remote command executions, shared access, and so on.

The technology disclosed herein enables improved accuracy identification of a threats by, for example, looking at raw events and discovering indicators of compromise (IOC). The IOC can be used along with other event characteristics (e.g., rare, blacklisted, anomalous, privilege elevation, etc.) to identify LM candidates. In some embodiments, dynamic weights are associated with event(s)/event segments/node(s)/feature(s)/feature vector(s)/etc. (e.g., based on suspicious event(s)/event segments/node(s)/feature(s)/feature vector(s)/etc. happening in relation to each other, such as at a similar time). Dynamic weights can also be applied to entities (e.g., a weight can be dynamically determined based upon importance of the entity, among others). In some embodiments, entities are pruned from LM candidates by removing peer group aligned patterns or anti-patterns, such as based on matching the pattern or anti-pattern with data of a data store that includes collected and stored patterns or anti-patterns, or other representations of patterns or anti-patterns.

A graph is created. In some embodiments, the graph is time constrained and is comprised of nodes which represent entities, and edges (also referred to as "connections") between nodes which represent login or other association activity between entities. Nodes or edges of the graph can be associated with various data, such as event(s), event segments, node(s), feature(s), feature vector(s), etc., and the nodes/edges/various data can have associated weights. A macro may be used to refine a population of LM candidates. A macro is data that can be used to identify various event-related data, e.g., specific tasks associated with a particular phase of an attack, among others. In an example, a macro comprises one or more features of one or more feature vectors associated with an entity. Some macros may have features that occur in a time-ordered sequence, while other macros may not have such sequencing. In another example, a macro represents a user account logging into a first machine, then changing the privileges of the user account to an administrator account, and then logging into another machine by use of the administrator privileges.

Macros may be matched with features or feature vectors across entities, and may be ordered in time. Macros may further be combined in sets of macros, with individual macros representing attack phases, and the set of macros representing, further attack phases, or even an an entire attack. Macro collections can be matched against a priori known patterns of conducting LM attacks. An aspect of improving accuracy of identification of threats includes refining a population of LM candidates, which can be facilitated by eliminating false positives, such as by eliminating those LM candidates that are determined to not indicate a threat. A population of LM candidates can be refined based on analysis of the graph, such as by use of macros, dynamic weights, computed path values, sizes of paths of the graph, among others. Each time that a population of LM candidates is refined, the resulting population can be identified as threats. The resulting population can also be further refined to identify a further pruned population of LM candidates, to further increase the accuracy of threat identification.

In one example scenario, a network intruder steals a user's credentials and uses the credentials to access a computer that the user typically does not access. Upon gaining access to the computer, the intruder performs various network-related activities, which spawn various network-related events. The intruder initially logs in to the computer and his user credential is authorized, spawning login and authorization-related events whose event data are logged by AD. The intruder next elevates privileges (which may also mask his identity, such as when he elevates his privileges to an administrative account) in order to access critical systems that store sensitive data, such as AD data, shares, databases, etc., and the associated event data is logged by AD. The intruder next runs a number of applications to further compromise the network, spawning a number of processes whose associated event data are logged by AD.

The intruder, wanting access to even more resources, initiates a brute force attack in an attempt to gain access to other user accounts, which results in numerous login failures, whose associated event data is logged by AD. The intruder utilizes a user account that was discovered via the brute force attack to login to an endpoint device, and the associated event data is logged by AD. The intruder downloads malware from a server outside the trusted network to the endpoint device. The event data associated with accessing the outside server, which happens to be a malicious server, is logged by a firewall, and the event data associated with downloading the malware to the endpoint device is logged by an endpoint application executing at the endpoint device. An endpoint application is an application that facilitates enhanced security of an endpoint device, such as by defending against malware attacks at the endpoint device, tracking network-related events at the endpoint device, etc. An endpoint application can be an endpoint security application. Examples of endpoint security applications include Symantec Endpoint Protection from Symantec Corporation, Cb Defense from Carbon Black, Inc., Endpoint Application Control from Trend Micro, Inc., etc.

A periodic batch job triggers a LM security application at midnight, and the LM security application accesses the log files of the various security platforms to analyze the event data and define a LM candidate population, which can be an initial identification of threats. One example of a LM security application is a LM Threat Model. In some embodiments, the LM security application is a real-time application, and the security platform(s) stream the event data to the LM security application for real-time analysis. The LM security application has access to a database or other data store of event data, event segments, or feature vectors (referred to herein as "stored event-related data") that indicate LM or LM candidates. Any access of "a database" herein need not be an access of a "database," per se, but can be an access of any component that stores the data associated with the events, such as a text file(s), a spreadsheet(s), memory, a disk file(s), a data store, a graph, etc. The data store further includes stored event-related data that indicate unlikely LM or LM candidates. In some embodiments, an event segment includes event data from one or more events, and is generated based on specific event parameters and selected event attributes. In some embodiments, an event segment includes data derived from event data. In an example, an event segment includes a feature which was derived from event data. Two event segments may have no events in common, may have one or more events in common, or may even have all events in common. In some embodiments, the stored event-related data is generated based on monitoring event data generated during attacks performed in a controlled environment, such as attacks performed on entities in a controlled environment of a laboratory.

A feature vector in this context is a summary or other alternate representation of an event segment, and can include the event data of an event segment, or data that represents or is derived from the event data of the event segment. In some embodiments, a feature vector includes representations of the event data of the event segment, such as: a numeric value that represents a certain set of events; a list of events and an associated binary value for each listed event, where the value is indicative of whether the event is present; a list of events and an associated value (e.g., 0, 1, 100) for each event, where the value is indicative of how many times the event is present, etc. The data store additionally includes, for some or all of the stored event-related data, a weight factor(s) that represents the weight that the stored event-related datum(data) should be given. In some embodiments, some or all of the weight factors are determined dynamically. In an example, a final weight factor is determined by multiplying a weight factor obtained from the data store by a factor that is dynamically determined, such as based on event data, data associated with a node, etc.

The LM security application analyzes the event data of the log files to extract events or event segments, and creates associated feature vectors for some or all of the event segments. The LM security application further identifies, for those events, event segments, or feature vectors (referred to herein collectively as "defined event data") that are associated with an entity, the entity(ies) with which the defined event data are associated.

The LM security application next identifies LM candidates. For example, the LM security application identifies or determines the defined event data associated with each entity. The LM security application matches some or all of the defined event data with stored event-related data that indicate LM or LM candidates to identify a weight factor(s) for the defined event data. The LM security application calculates a score for each entity based on the defined event data associated with the entity and the associated weight factor(s). All entities with a score above a certain threshold are identified as LM candidates. The thresholds can be different for each type of entity (e.g., can be 1000 for computers, 1500 for user accounts, 1750 for applications, etc.). The LM security application next prunes the LM candidates based on defined event data that match stored event-related data that indicate unlikely LM or LM candidates.

The event data include time-related data, such as timestamp data, which enables some or all of the event data to be sequenced. The LM security application analyzes the timestamp data to sequence the event data, and creates a data structure which represents an associated time constrained graph. The graph includes nodes and connections between nodes. Each node of the graph represents an entity, and each connection represents a login or a sequence of events/event segments that associates one entity with another entity, where the direction of the connection represents a time sequence. A sequence of events/event segments can include, e.g., just one event/event segment. The feature vector(s) that are associated with a particular entity are associated by the LM security application with the node of the graph that represents the particular entity.

The LM security application further refines the set of LM candidates based on the graph. A data store of macro data, which include sequences of nodes and associated feature vectors or other data derived from event segments (referred to herein as "node sequences" or "paths") that indicate LM or LM candidates, was previously generated. The data store additionally includes, for some or all of the paths, a weight factor that represents the weight that a path can be given. The LM security application matches portions of the graph (e.g., paths of the graph) with paths of the data store to identify a weight factor(s) for paths that match paths of the graph. The LM security application calculates a score for each entity based on the paths associated with the entity and the associated weight factor(s). Entities with a score below a certain threshold are removed from the LM candidates.

The LM security application further refines the set of LM candidates based on a hybrid analysis. A hybrid analysis can be used to refine any population of LM candidates. The LM security application calculates a score for each entity that is based on a combination of items, for example, weights of feature vectors, weights of entities, and weights of paths. Entities with a score below a certain threshold are removed from the LM candidates, and the remaining entities may be identified as threats. In some embodiments, entities with a score above a certain threshold are identified as threats.

As a result of the more accurate identification of LM candidates enabled by the disclosed technology, threats can be more accurately identified. By more accurately identifying threats, resources, such as compute resources or humans in the form of IT security professionals, can be more productively utilized to identify those threats that exhibit actual malicious LM.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices. As used herein, unless specifically stated otherwise, the term "or" can encompass all possible combinations, except where infeasible. For example, if it is stated that a data store can include A or B, then, unless specifically stated otherwise or infeasible, the data store can include A, or B, or A and B. As a second example, if it is stated that a data store can include A, B, or C, then, unless specifically stated otherwise or infeasible, the data store can include A, or B, or C, or A and B, or A and C, or B and C, or A and B and C.

As used herein, terms such as "connected," "coupled," or the like, refer to any connection or coupling, either direct or indirect, between two or more elements. The coupling or connection between the elements can be physical, logical, or a combination thereof. References in this description to "an embodiment," "one embodiment," or the like, mean that the particular feature, function, structure or characteristic being described is included in at least one embodiment of the present disclosure. Occurrences of such phrases in this specification do not necessarily all refer to the same embodiment. On the other hand, the embodiments referred to also are not necessarily mutually exclusive.

As used herein, terms such as "cause" and variations thereof refer to either direct causation or indirect causation. For example, a computer system can "cause" an action by sending a message to a second computer system that commands, requests, or prompts the second computer system to perform the action. Any number of intermediary devices may examine and/or relay the message during this process. In this regard, a device can "cause" an action even though it may not be known to the device whether the action will ultimately be executed.

Note that in this description, any references to sending or transmitting a message, signal, etc. to another device (recipient device) means that the message is sent with the intention that its information content ultimately be delivered to the recipient device; hence, such references do not mean that the message must be sent directly to the recipient device. That is, unless stated otherwise, there can be one or more intermediary entities that receive and forward the message/signal, either "as is" or in modified form, prior to its delivery to the recipient device. This clarification also applies to any references herein to receiving a message/signal from another device; i.e., direct point-to-point communication is not required unless stated otherwise herein.

FIG. 1 illustrates the configuration of an exemplary network environment 100. Network environment 100 includes trusted network 110 and untrusted network 170. Trusted network 110 in this example is a private network of a corporation, and untrusted network 170 is the Internet. Firewall 160 is a security platform, either hardware or software based, that monitors network traffic and uses rules to control incoming or outgoing network traffic. Firewall 160 protects against unauthorized or unwanted network traffic between trusted network 110 and untrusted network 170. Endpoint devices 115 and 116 can be devices that are primarily used by a single user, such as a laptop computer, a desktop computer, a smartphone, a tablet, etc., or can be any device that is not a networked device, among others. It will be appreciated that the present disclosure is not limited to any specific configuration for the network environment.

In this example, a directory service of trusted network 110 is configured as an AD domain, including the AD domain controllers 112-114, domain member machines acting as sources and destinations of activities (such as the endpoint devices 115-116), the AD store 111, and a variety of many other network components that are well known in the art. While the directory service of this example is AD, it will be appreciated that a directory service can be any type of directory service. By using the domain controllers 112-114, network activities on the trusted network 110 are reported and recorded in the form of AD events. For event reporting, it suffices that at least a part of the interaction of an activity involves an AD domain entity. In some embodiments, endpoint applications also report and record network activities in the form of AD events. The AD store maintains an AD event log, and event data can be received from domain controllers 112-114, from endpoint devices 115-116, and the like. The trusted network 110 may provide and include any kinds of shared resources or services to authorized users and may have any type of network topology. Endpoint devices 115 and 116 each execute an endpoint application, which logs events that the application monitors or facilitates and that are related to the endpoint device on which the application is installed. The endpoint application can log the events at the endpoint device on which the endpoint application is installed, at file server 117, or at any other device to which the endpoint application has access. Security system 118 is a computer system that includes a security platform that identifies LM candidates. Firewall 160 logs events which it monitors or facilitates. In some embodiments, the event data logged by AD, by the endpoint application, or by the firewall can, instead or in addition to being logged, be streamed to recipients, such as to security system 118 or to other systems or applications.

FIGS. 2 through 6 relate to an example of a method for identifying a set of LM candidates that may pose a security threat based on detecting suspicious lateral movement of a user. Techniques discussed later in this disclosure may be used to refine/prune the set of LM candidates. In some embodiments, for example, the LM candidates/security threats identified via the method of FIGS. 2-6 can be pruned via steps 1125-1140 of FIG. 11. Lateral movement refers to a network activity in which a user, who may be an attacker, progressively gains access to an increasing amount of resources inside a networked infrastructure, which is a situation that may be (but is not necessarily) indicative of a security threat. Lateral movement may indicate the possibility that the credential of a user has been stolen, that the user's device has been controlled by malicious software, etc. For example, a wrongdoer may steal a user's credential and use the stolen credential to access a device that the user typically does not access, for example, in order to search for targeted or key data or assets, among others. An analyzer may recognize such an activity as an anomaly. Furthermore, if the analyzer detects that the anomaly (directly or through other anomalies) leads to a result that the wrongdoer (disguised as a legitimate user) gains access to a device designated as a critical resource, such as an AD store, an AD controller, a file server, etc., the analyzer can recognize a security threat represented by a set of the relevant anomalies. An "anomaly" is a detected deviation from an expected pattern of behavior on the part of an entity, which deviation may or may not constitute a threat. An anomaly represents an event of possible concern, which may be actionable or warrant further investigation. An anomaly is an observable or detectable fact, or data representing such fact. A threat is an interpretation of one or more anomalies and/or threat indicators. Threat indicators and threats are escalations of events of concern.

The technology introduced here assigns similarity scores to devices in a computer network based on relationships between users and the devices. For example, the relationships can include information regarding certain users logging into devices. The similarity scores suggest the similarities between the devices in terms of associated users, and may identify the devices as members of a peer group, which is a group of similar peers (in this case, devices). The method further generates or identifies classification metadata of the user and the device, based on event data about the login event, to further explain the relevance of the user and the device in a security context. The classification metadata can be event data, an event segment, or a feature vector, among others. The method then detects an anomaly based on the classification metadata and similarity scores when a user interacts with a device having a similarity score that is significantly different from the similarity scores of devices with which the user usually interacts. Based on the detected anomaly, the method may further determine a security threat based on the relationship information by identifying, in a relationship graph, a relationship path from a user through anomalies to a critical resource.

In some embodiments, the method described here can be implemented by a machine learning model. For example, processing logic of a machine learning model can generate the classification metadata, or assign usage similarity scores, or both, as further described below.

In some embodiments, the processes of generating the classification metadata and/or assigning usage similarity scores are performed in real-time as the event data are received. In other embodiments, either or both of these processes are performed in batch mode based on event data stored in a non-volatile storage facility.

Figure 2:
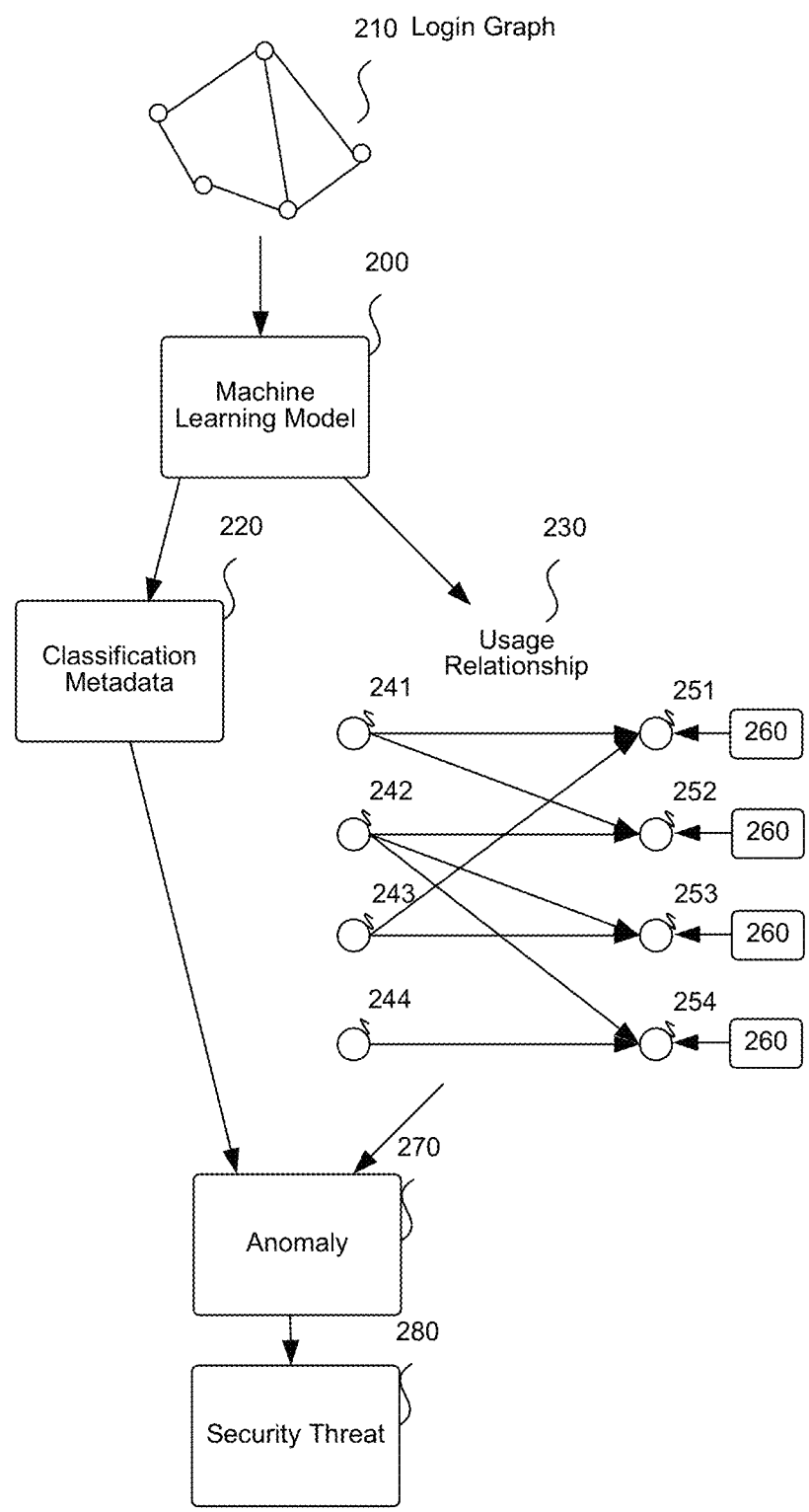
FIG. 2 is a block diagram illustrating a machine learning model that detects lateral movement in a computer network.

FIG. 2 is a block diagram illustrating a machine learning model that detects lateral movement in a computer network. The computer network includes entities, such as network devices, user accounts, applications, etc. Machine learning model 200 analyzes event data 210. Event data 210 can be, e.g., timestamped machine data. Event data 210 include information regarding computer network activities of user accounts, network devices, applications, etc. In some embodiments, event data 210 includes a projection of a security-related graph (also referred to herein as a "security graph"). The particular projection of the security graph of FIG. 2 is a "login projection" or "login graph", which records information related to login events in which users log into network devices of the computer network. In another example, a "login graph" records information related to login or other association activities between entities.

Based on event data 210 (e.g., the login graph), machine learning model 200 generates classification metadata 220 for some or all of the network devices and the users. In some embodiments, machine learning model 200 generates classification metadata 220 for some or all applications accessed by users. In some embodiments, classification metadata 220 helps explain the relevance in a network security context of each of the users, each of the network devices, and, each of the applications. For example, classification metadata 220 for a particular user can include metadata indicative that the user is a regular user, an administrative user, or an automated (machine-implemented) user, etc. Classification metadata 220 for a particular network device can include metadata indicative that the particular network device is a workstation, a server, a printer, a tablet, a smartphone, an endpoint device, etc. Classification metadata 220 for a particular application can include metadata indicative of the type of the application, the objects accessed by the application, etc. Classification metadata 220 for any entity can include event data, event segments, or feature vectors associated with the entity.

Because classification metadata 220 are generated based on event data 210, machine learning model 200 does not need additional metadata that explicitly annotates the types of the user, network devices, applications, etc. Machine learning model 200 can automatically recognize the types of the users, network devices, applications, etc. based on the event data representing the network activities involving the users, network devices, or applications.

Machine learning model 200 further identifies usage relationships 230 between users, network devices, or applications based on event data 210. For example, if event data 210 includes a login graph having information that relates to the login events, machine learning model 200 can identify the usage relationships 230 as login events indicative of the users logging into the network devices. In some embodiments, usage relationship 230 can be presented as a graph having nodes and edges (also referred to as "connections") interconnecting the nodes, as illustrated in FIG. 2. The nodes represent network entities such as users, network devices, and applications and the edges represent login or other association activities between the nodes.

As shown in FIG. 2, the usage relationships 230 between the users and the network devices can be captured in a bipartite graph including a first set of nodes representing users (nodes 241, 242, 243 and 244) and a second set of nodes representing network devices (nodes 251, 252, 253 and 254). In some embodiments, the graph is a tripartite graph that additionally includes a third set of nodes representing applications. In this example, the first and second sets are disjoint sets. Every edge in the bipartite graph connects a user node in the first set to a device node in the second set. In addition, the relationships 230 between the user nodes and the device nodes also represent a time series of events in which the users have interacted (e.g., logged in) with the network devices.

Figure 4:
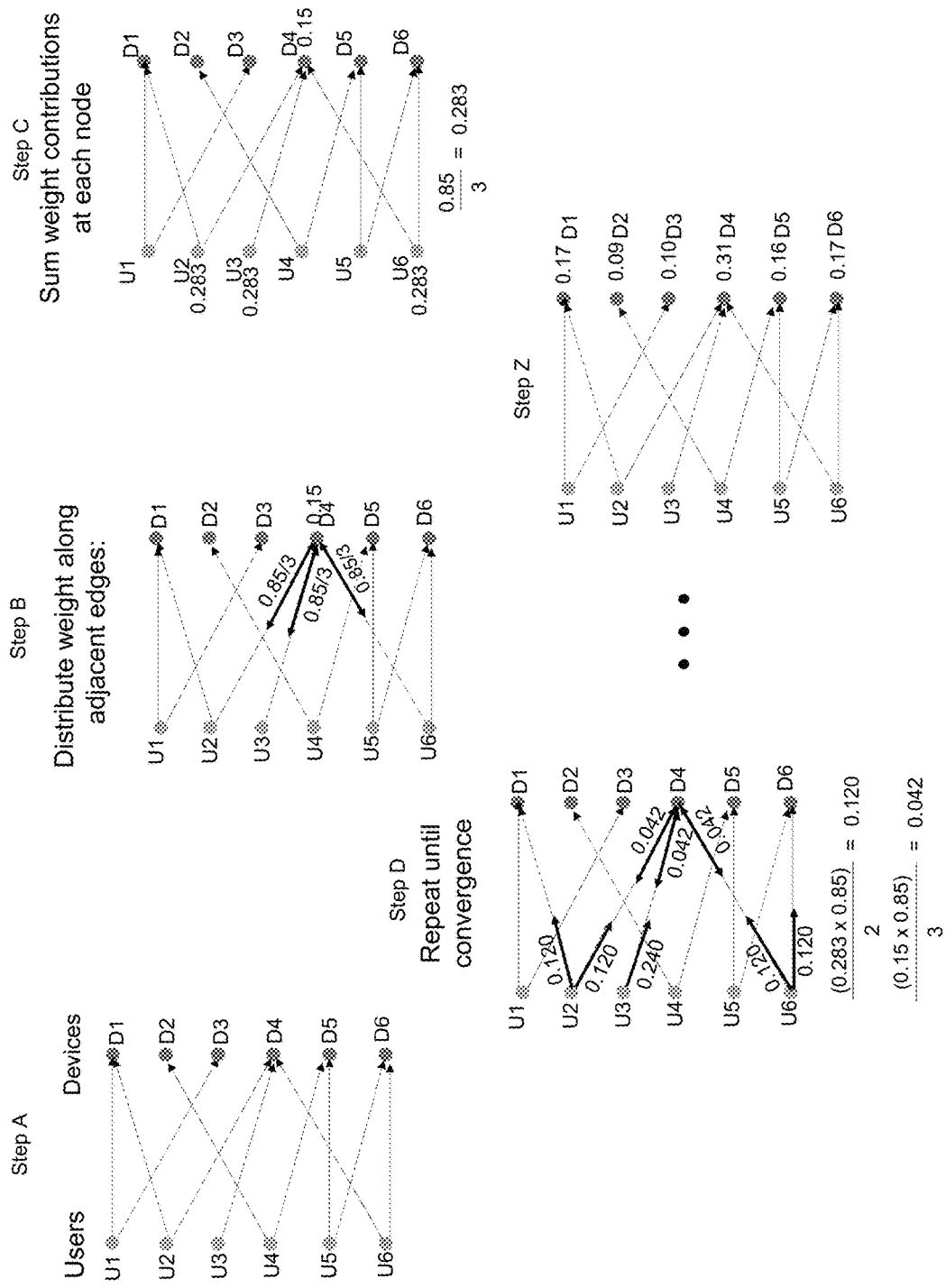
FIG. 4 illustrates an example of a process of assigning similarity scores to network devices.

Based on the usage relationships 230, machine learning model 200 assigns usage similarity scores 260 (also referred to as "similarity scores") to the network devices represented by the device nodes. The usage similarity scores 260 indicate which of the devices have been used by the same or similar group of users. The details of the process of assigning usage similarity scores 260 are illustrated in FIG. 4.

The similarity scores are assigned such that any given set of network devices that are accessed by the same or similar group of users are assigned similarity scores that are closer in value to each other than the similarity scores of any other set of network devices that are not accessed by the same or similar group of users. In other words, a group of network devices that have similar groups of login users tend to have similarity scores that are closer in value to each other than similarity scores of network devices that do not have similar groups of login users. Such a group of network devices that have similarity scores that are closer in value can be identified as a peer group of network devices.

Figure 3:
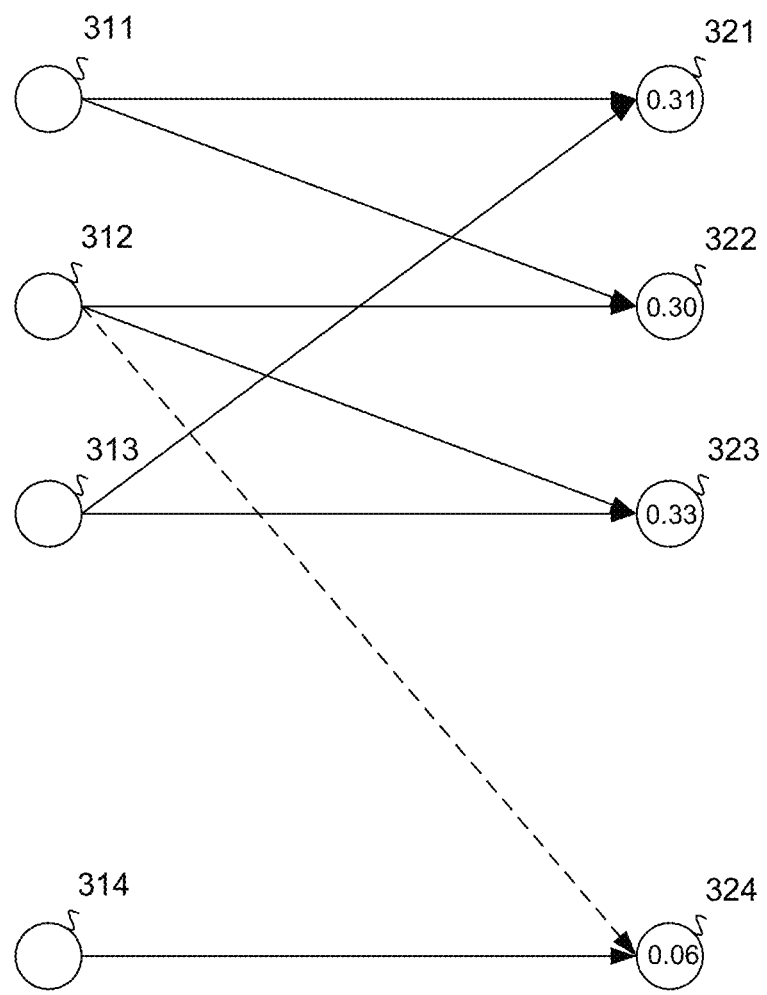
FIG. 3 illustrates an example of a bipartite graph showing events of users logging into network devices.

FIG. 3 illustrates an example of a bipartite graph showing events of users logging into network devices. Bipartite graph 300 includes a group of user nodes 311, 312, 313 and 314, and a group of device nodes 321, 322, 323 and 324. The edges between the user nodes and device nodes represent the login activities. To facilitate discussion, the reference numerals in FIG. 3 are used interchangeably to refer to the nodes and the users or network devices represented by those nodes.

As shown in FIG. 3, two users 311 and 313 have logged into device 321. Two users 311 and 312 have logged into device 322. Two users 312 and 313 have logged into the device 323. Therefore, devices 321, 322 and 323 are associated with a similar groups of users, i.e., users 311, 312 and 313, and are identified as a peer group.

In contrast, before user 312 logs into device 324, wherein the dashed line represents that particular login activity, only user 314 has logged into device 324. The group of user(s) that has/have logged into device 324 is substantially different from the groups of users that have logged into devices 321, 322 and 323. This difference is reflected in the similarity scores assigned to devices 321, 322, 323 and 324. Devices 321, 322 and 323 have similar (numerically close) similarity scores of 0.31, 0.30 and 0.33, respectively. On the other hand, device 324 has a similarity score of 0.06, which is significantly different from the similarity scores of devices 321, 322 and 323.

Once the user 312 logs into device 324 (as represented by the dashed line in FIG. 3), the machine learning model 200 determines the similarity score of the particular device 324 (i.e., 0.06 for device 324) fails to satisfy a specific closeness criterion relative to similarity scores of network devices with which the particular user usually interacts (i.e., 0.30 for device 322 and 0.33 for device 323). The closeness criterion can be of various different types in different embodiments. For example, machine learning device 200 may determine that the difference between the similarity score of the particular network device 324 and an average of the similarity scores for network devices 322 and 323 is 0.255, which exceeds a threshold of 0.2. The machine learning model 200 then detects an anomaly because the difference of similarity scores exceeds the threshold value.

In an alternative embodiment, machine learning model 200 can further calculate an anomaly score for the particular user and decide whether anomaly is detected based on the anomaly score. The anomaly score is indicative of a likelihood that the anomaly relates to a security threat. The anomaly score can be calculated based on, for example, the difference between a similarity score of the particular network device and a statistical measure (e.g., an average) of similarity scores of other devices with which the user has interacted. Machine learning model 200 then detects the anomaly if the model determines that the anomaly score exceeds a threshold value for anomaly scores.

For example, the similarity score of network device 324 is 0.06, and the average similarity score of network devices 322 and 323 is 0.315. The difference between the similarity scores is 0.255. The machine learning model calculates the anomaly score as, e.g., 0.355, by summing the similarity score difference of 0.255 and an extra weight of 0.1 in recognition that network device 324 is a server of high importance. Because the anomaly score of 0.355 exceeds a threshold of 0.3, the machine learning model 200 detects an anomaly.

Alternatively, machine learning model 200 can detect an anomaly based on an access profile of a particular user. The access profile of the particular user includes network devices with which the particular user interacts and that have similarity scores that satisfy a specific closeness criterion. For example, the differences of the similarity scores of network devices 322 and 323 within the access profile of user 312 is 0.03 and is less than a threshold value of 0.1. In some embodiments, the access profile of the particular user 312 can further include, e.g., information of events indicative that the particular user succeeded logging in to a network device, failed logging in to a network device, succeeded validating credential of a network device, failed validating credential of a network device, succeeded accessing a network object stored on a network device, or failed in accessing a network object stored on a network device.

When user 312 interacts with a particular network device 324, the machine learning model 200 calculates the anomaly score for the particular user based on a difference between the similarity score of the particular network device 324 and the average of similarity scores of network devices 322 and 323 in the access profile of the particular user 312. Machine learning model 200 detects the anomaly if the similarity score difference indicates that the particular user 312 has interacted with the particular network device 324 outside of the access profile of the particular user 312.

Machine learning model 200 can assign similarity scores to the network devices in various ways. FIG. 4 illustrates an example of a process of assigning similarity scores to network devices. A similar process can be used to assign similarity scores to applications. At step A in FIG. 4, the machine learning model 200 receives a bipartite graph. The bipartite graph includes a group of nodes U1-U6 representing users (also referred to as "user nodes") and another group of nodes D1-D6 representing network devices (also referred to as "device nodes"). In some embodiments, the graph is a tripartite graph that additionally includes applications. The bipartite graph further includes edges interconnecting the nodes. The edges represent login or other association activities between the entities represented by the nodes. Machine learning model 200 selects a device node D4 and assigns an initial weight value of 1 to the selected device node D4. In some embodiments, machine learning model 200 can, e.g., select the device node in a random manner. The initial weight value can also have a value different from 1.

At step B in FIG. 4, machine learning model 200 keeps a percentage (15%) of the initial weight value of 1 at the device node D4, and equally distributes a remainder of the initial weight value 1 from the device node D4 along the edges of D4 to nodes U2, U3 and U6. In some embodiments, the machine learning model decides the percentage of 15% before starting the similarity score assignment process.

The value distribution process can be viewed as a Markov chain process. At each step, the value distributor(s) have a probability of 15% (hence the percentage is also referred to as "probability percentage") to remain at the same node as in the previous step; the value distributor(s) have a probability of (100%−15%=85%) to follow an edge of the node to move to another node. In some other embodiments, the similarity score assignment process can use a percentage other than 15%.

As show in step C of FIG. 4 after the distribution, the machine learning model 200 keeps a weight value of 0.15 (=1*15%) at the device node D4. The machine learning model 200 equally distributes a remainder of the initial weight value (0.85=1*0.85%) to user nodes U2, U3 and U6. Each node of user nodes U2, U3 and U6 receives a weight value of 0.283 (=0.85/3).

For each node, the machine learning model 200 repeats the process of distributing along edges until the weight values at the network devices D1-D6 converge. Step D in FIG. 4 shows the next step in the iterative process. For device node D4, machine learning model 200 keeps a weight value of 0.023 (=0.15*15%) at device node D4, and distributes 0.042 (=(0.15*85%)/3) to each of user nodes U2, U3 and U6. For user node U2, the machine learning model 200 keeps a weight value of 0.042 (=0.283*15%) at user node U2, and distributes 0.120 (=(0.283*85%)/2) to each of device nodes D1 and D4.

Similarly, for user node U3, machine learning model 200 keeps a weight value of 0.042 (=0.283*15%) at user node U3, and distributes 0.241 (=(0.283*85%)/1) to device D4. For user node U6, the machine learning model 200 keeps a weight value of 0.042 (=0.283*15%) at user node U6, and distributes 0.120 (=(0.283*85%)/2) to each of device nodes D4 and D6.

Machine learning model 200 continues the iterative process until the weight values at network devices D1-D6 converge. At each step of the iterative process, for each node, machine learning model 200 keeps 15% of the weight value at the node and then equally distributes the remainder of the weight values along the edges to other nodes. The convergence criterion can be any criterion indicative of this type of convergence. For example, machine learning model 200 can determine that the iterative process reaches a convergence when the change of weight values between two consecutive steps at each node is less than a threshold value.

Step Z of FIG. 4 shows the status of a final step with converged weight values when the iterative process reaches a convergence. The converged weight values at the devices D1-D6 are similarity scores assigned to these devices. The machine learning model 200 uses the similarity scores to determine whether multiple network devices are similar in terms of associated users that interact with the devices.

Figures 5A, 5B, 5C, 5D:
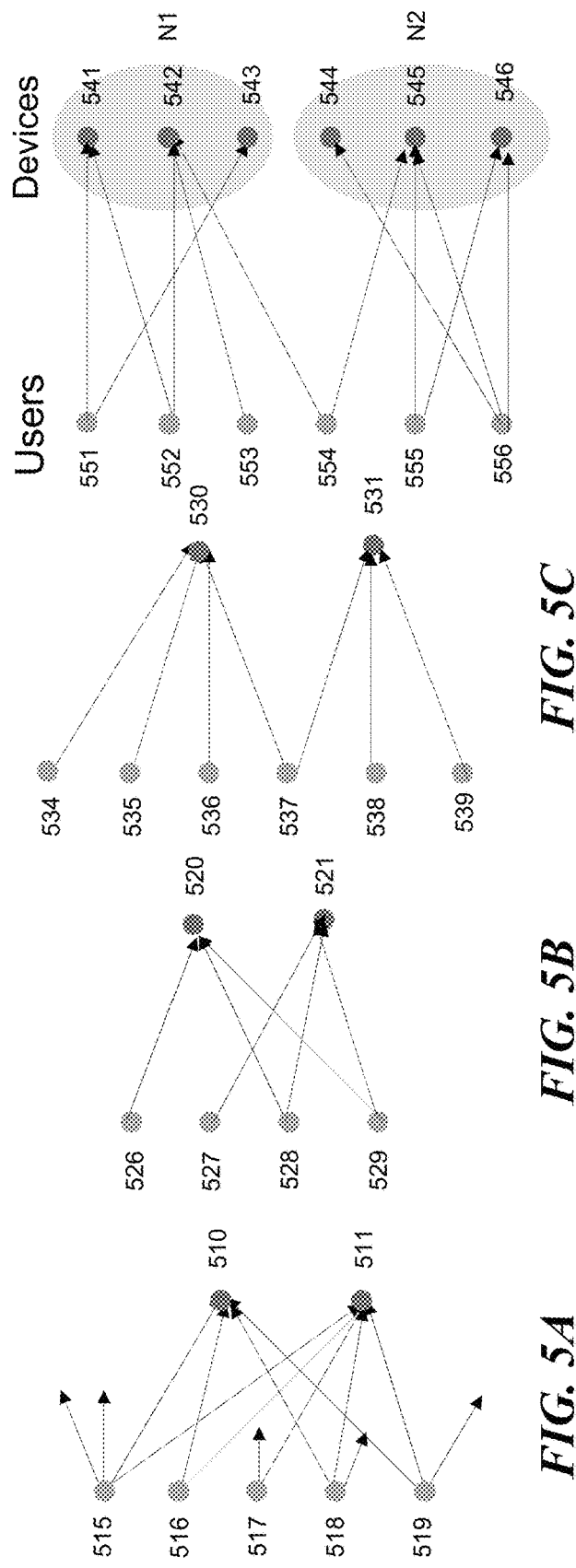
FIG. 5A shows an example of a bipartite graph having network devices that have many shared users and tend to have close similarity scores.
FIG. 5B shows an example of a bipartite graph having network devices that have multiple shared exclusive users.
FIG. 5C shows an example of a bipartite graph having network devices that have one shared user.
FIG. 5D shows an example of a bipartite graph having network devices that are associated with similar groups of users.

FIGS. 5A through 5D illustrates examples of bipartite graphs that machine learning model 200 uses to determine whether network devices or applications are similar in terms of interacting users. In FIG. 5A, network devices 510 and 511 have many shared users (515, 516, 518 and 519) and therefore tend to have similarity scores close to each other.

In FIG. 5B, applications 520 and 521 have multiple shared users (528 and 529). Applications 520 and 521 thus tend to have similarity scores close to each other. In FIG. 5C, applications 530 and 531 only have a single shared user 537. Applications 530 and 531 thus tend to have similarity scores that have a large difference.

In FIG. 5D, network devices 541, 542 and 543 are associated with similar groups of users, including users 551, 552, 553 and 554. Network devices 544, 545 and 546 are associated with similar groups of users, including 554, 555 and 556. If user 554 is removed from the bipartite group, the devices can be separated into two groups N1 (541, 542 and 543) and N2 (544, 545 and 546) without interactions between the two groups, based on the user interactions.

User 554 is the only user that has connected to devices of both groups N1 and N2. The group N1 of devices 541, 542 and 543 have similarity scores close to each other. The group N2 of devices 544, 545 and 546 have similarity scores close to each other. Assuming that user 554 typically interacts with device 545 from group N2, the access profile of user 554 includes the group N2 of devices 544, 545 and 546. The interaction between the user 554 and device 542 from group N1 then triggers an out-of-group access anomaly, because the similarity score of device 542 is significantly different from the similarity scores of devices 544, 545 and 546 within the access profile of user 554.

Figure 6:
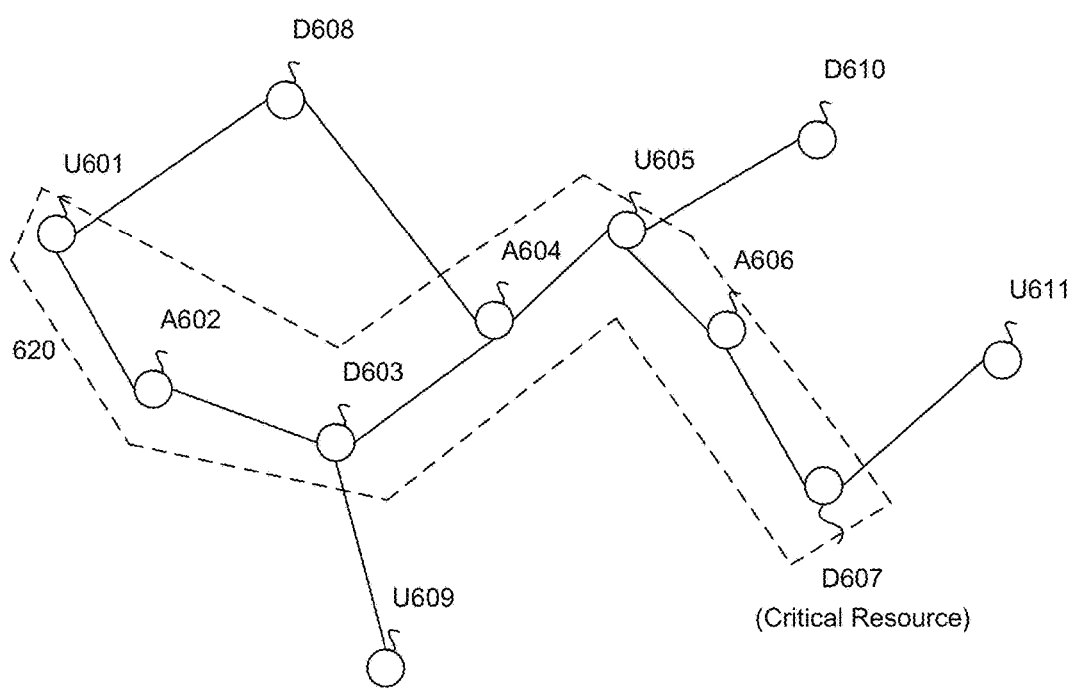
FIG. 6 illustrates an example of a graph data structure for detecting security threats based on a detected out-of-profile anomaly.

The detected out-of-group anomaly is an indication of a suspicious lateral movement of a particular user in the network. Based on the anomaly, machine learning model 200 can further decide whether anomaly 270 leads to a security threat 280, as illustrated in FIG. 2. FIG. 6 illustrates an example of a data structure for detecting security threats based on the detected out-of-profile anomaly.

The machine learning module 200 retrieves graph data structure 600 that records anomalies in the network and the relationships between the anomalies and the users and network devices. The graph data structure includes nodes interconnected by edges. The nodes represent anomalies and entities such as users and network devices; while the edges represent relationships between the entities and anomalies.

For example, FIG. 6 shows that the retrieved graph data structure 600 includes user nodes U601, U605, U609 and U611 and device nodes D603, D607, D608 and D610. The retrieved graph data structure 600 further includes anomaly nodes A602, A604 and A606. Among the anomaly nodes, the anomaly node A602 represents an out-of-profile anomaly. In other words, the user represented by user node U601 has accessed the device represented by device node D603 with which the user does not usually interact.

The retrieved graph data structure 600 is different from the login graph that machine learning module 200 uses to detect the out-of-profile anomaly. A login graph may only record information that relates to the login events of the users. In contrast, the retrieved graph data structure 600 can include relationships beyond the login events and can include anomalies of other types besides out-of-profile anomalies. For example, the retrieved graph data structure 600 includes anomaly node A606 representing a blacklist anomaly. The blacklist anomaly indicates that user U605 has accessed network device D607 from a blacklisted IP address.

The retrieved graph data structure 600 further includes anomaly node A604 representing a beaconing anomaly. The beaconing anomaly indicates that the device represented by device node D603 sends suspicious beaconing messages periodically to a user device associated with the user represented by user node U605.

The machine learning model 200 identifies, in the retrieved graph data structure 600, a relationship path 620 that suggests a security threat. Relationship path 620 starts with user node U601 and anomaly node A602 that represents the out-of-profile anomaly. Relationship path 620 ends with anomaly node A606 and device node D607 that represents a device designated as a critical resource. For example, the device designated as a critical resource can be, e.g., a domain controller server that responds to security authentication requests within the computer network.

Relationship path 620 includes user nodes and device nodes interlinked by anomaly nodes A602, A604 and A606. In other words, the relationship path 620 starts from user U601 through anomaly nodes A602, A604 and A606 to the device D607 designated as a critical resource of the computer network.

Machine learning model 200 identifies a security threat based on the relationship path 620. The security threat is represented by the anomaly nodes A602, A604 and A606 along the relationship path 620. These anomaly nodes suggest that the security threat is imposed by a series of anomalies. For example, in one embodiment, the security threat can indicate that an unauthorized user (invader) has misappropriated a credential of the particular legitimate user to enter the network through device D603 and breached one or more network devices (D603, D607) along the relationship path to access the critical resource on device D607.

When a security threat has been detected, the security platform then reports the threat to an administrator of the network (e.g., via the GUI features described above) and/or writes the security threat into a threat log for later review by an administrator.

Figure 7:
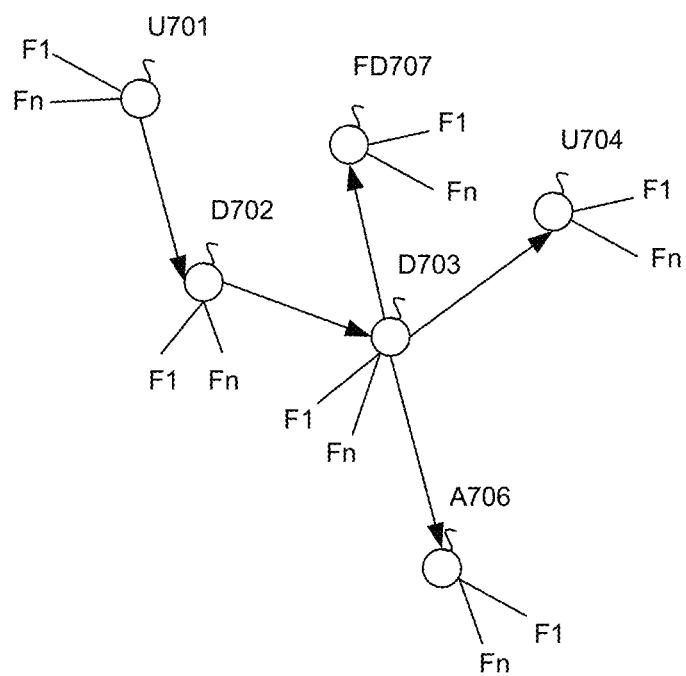
FIG. 7 illustrates an example of a graph data structure that is indicative of time sequence for detecting lateral movement candidates.

FIG. 7 is an illustration of a graph data structure that is indicative of time sequence for detecting LM candidates. Graph 700 is created by an LM security application. The LM security application accesses log files created by various security platforms, and creates the graph based on an analysis of the event data of the various log files. Some or all of the event data includes information, such as timestamp information, that enables a time sequence of the event data to be determined. Graph 700 includes nodes, each of which represents an entity, and edges, each of which represents login or other association activity between the entities. The nodes include one or more associated feature vectors (e.g., F1, Fn). The circles of graph 700 each represent a node, and the straight lines that connect two nodes each represent an edge, or a connection, with the arrow representing time progression or a time sequence.

In the example of FIG. 7, node U701 represents a first user. The associated feature vectors (e.g., F1 Fn of node U701) each represent or are derived from an event segment. Each event of the event segment of this example has associated time-related data, such as timestamp data, and a time sequence of the events can be determined based on the time-related data. A user (user1) logs in to a device, which spawns account authorization of the user1 account. The events associated with this authorization are logged as event data by a security platform, in this instance, AD. The LM security application, based on an analysis of the AD log file, creates feature vector F1 of node U701 based on an event segment that is indicative of a user1 account authorization. Accordingly, F1 of node U701 is indicative of a user1 account authorization, as it was derived from an event segment that is indicative of a user1 account authorization.

Figure 9A:
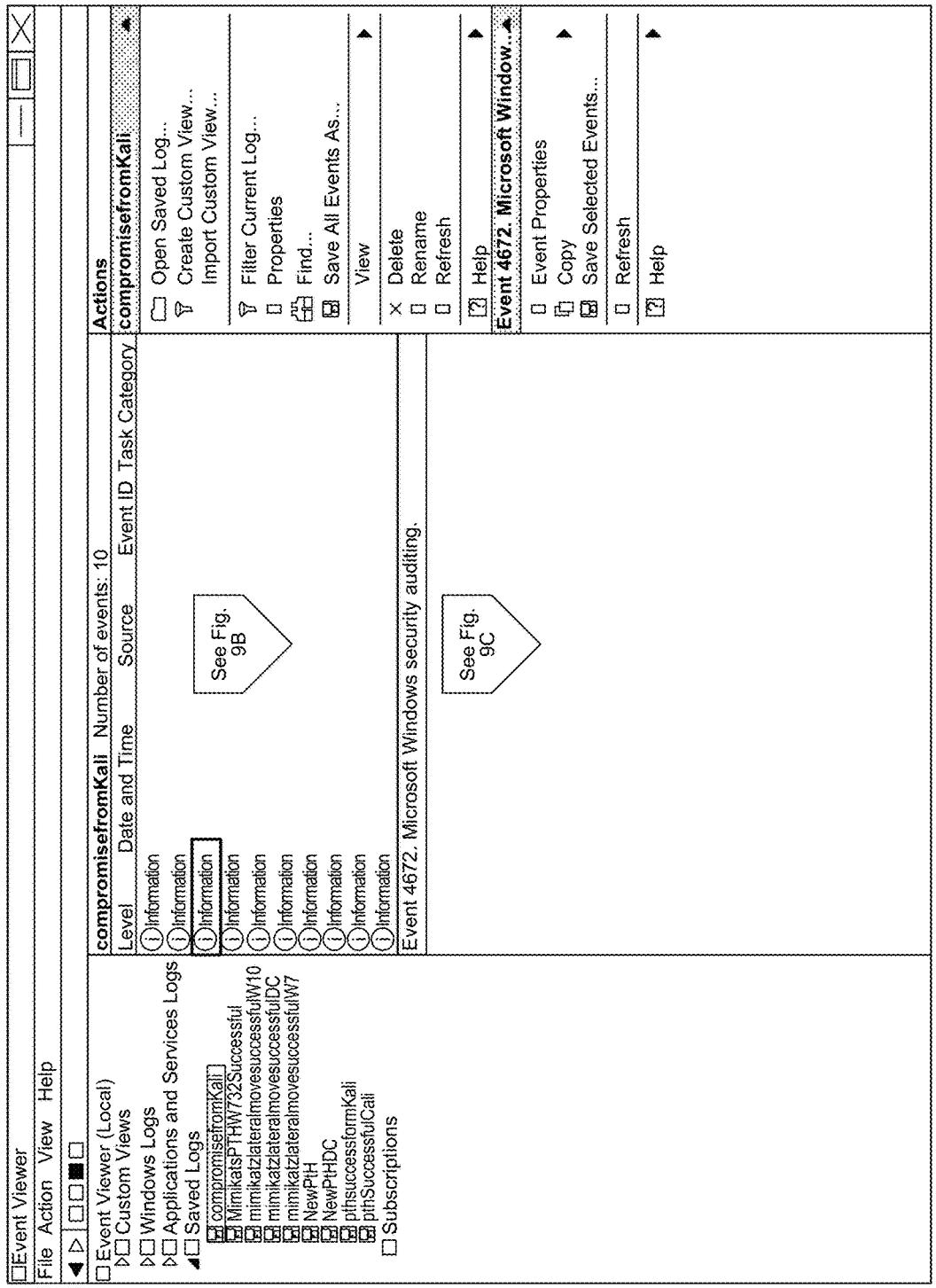
FIG. 9A is an example of an event segment that is indicative of a privilege elevation.

The LM security application continues analyzing the event data, and continues with the creation of graph 700. F2 of node U701 is created and is indicative of a suspicious download by user1. F3 of node 701 is indicative of a privilege elevation for user1. FIGS. 9A-C are an example of an event segment that is indicative of a privilege elevation.

Figure 8A:
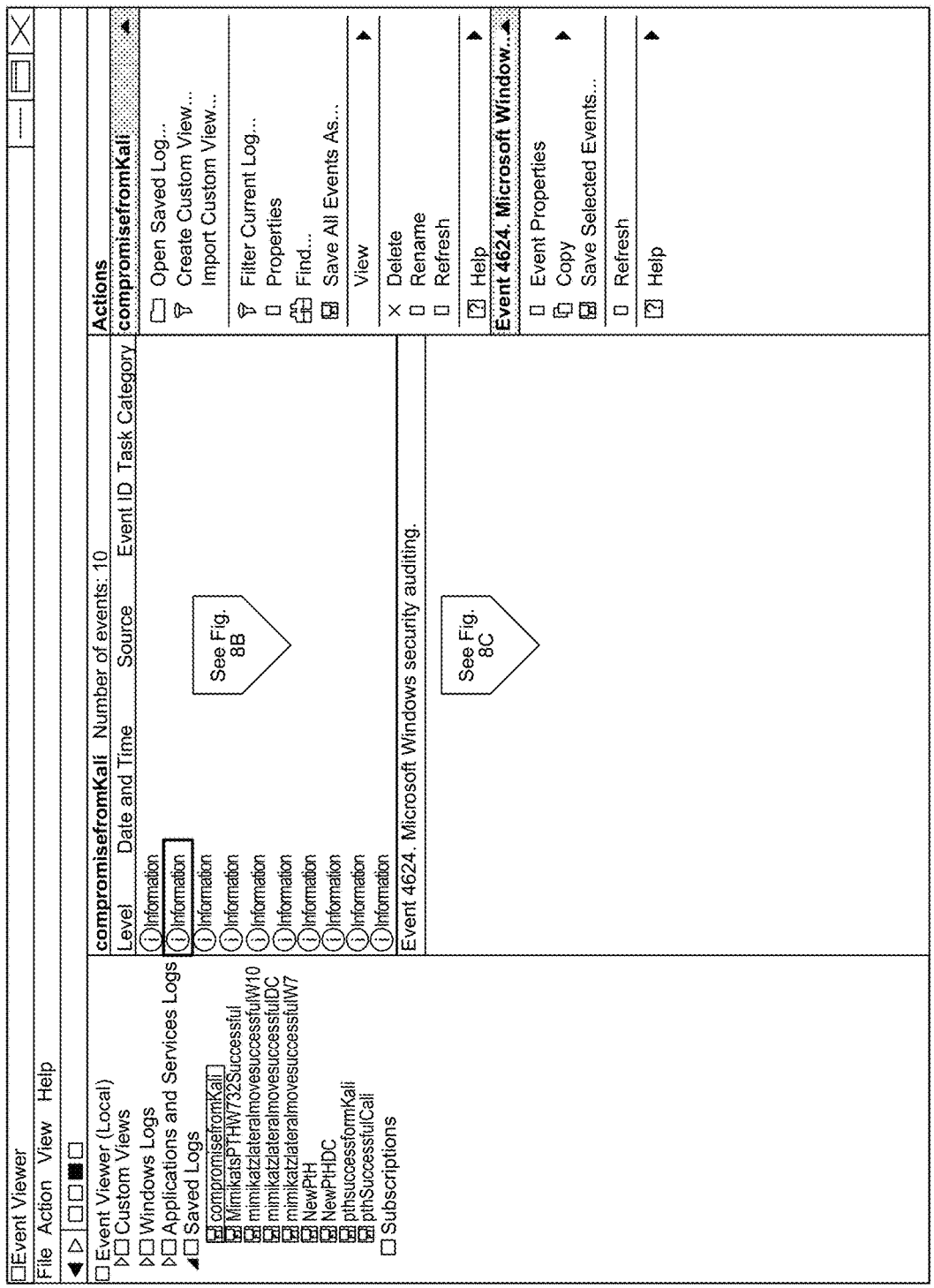
FIG. 8A is an example of an event segment that is indicative of a suspicious logon.

The LM security application determines that, at a time later than an event associated with a feature vector of U701, user1 logs in to a first device, and the LM security application creates node D702 to represent the second device. The edge from node U701 to node D702 represents a login event, such as AD event 4624 (an account was successfully logged on), which is logged by AD when user1 logs into the first device. The LM security application creates F1 of node D702 to indicate a logon event at the first device. FIGS. 8A-C are an example of an event segment that is indicative of a suspicious logon. A suspicious logon is indicated in the example of FIGS. 8A-C in part as a result of AD event 4624 (an account was successfully logged on) being followed by AD event 4672 (special privileges assigned to new logon).

Figure 10A:
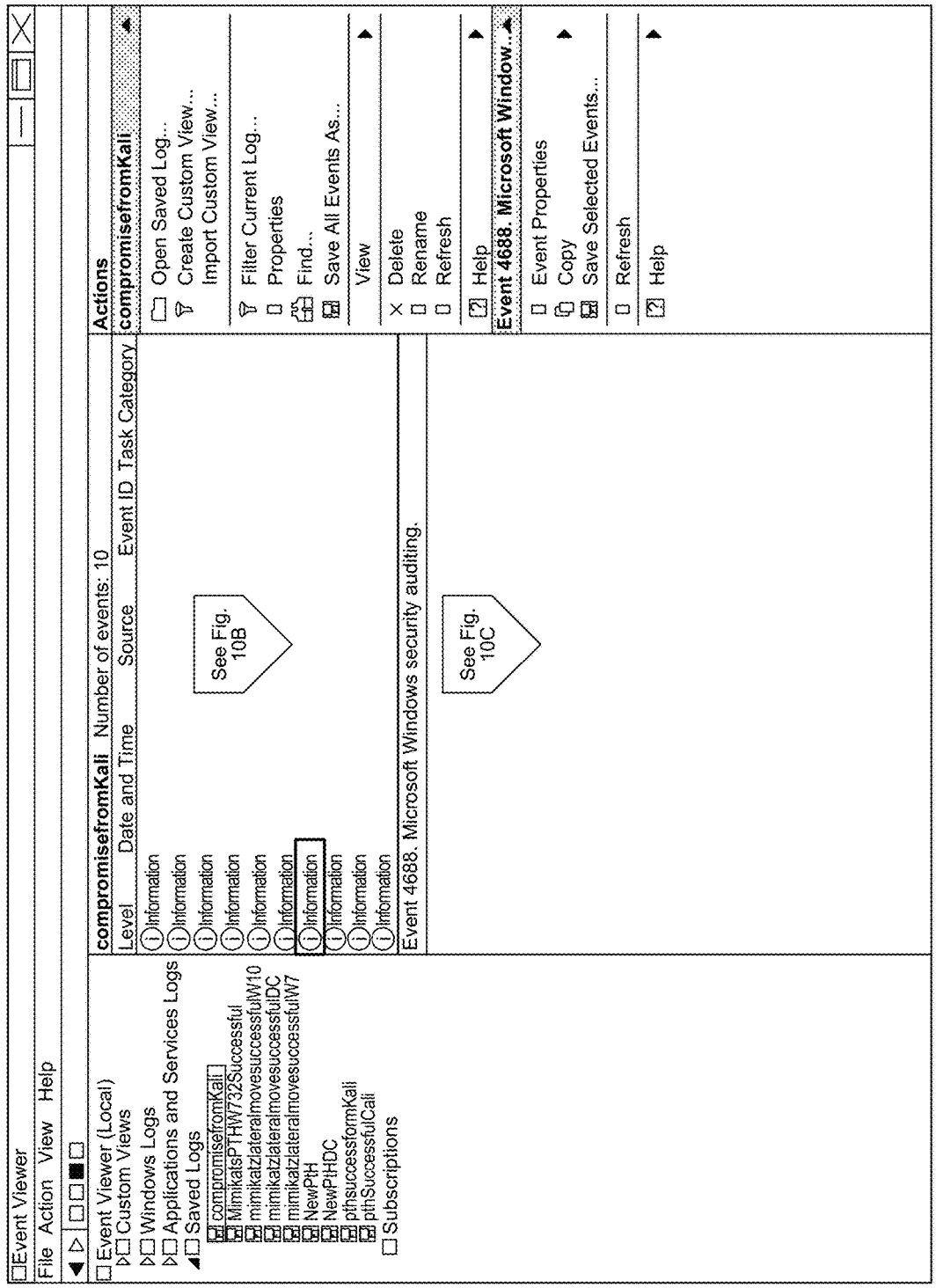
FIG. 10A is an example of an event segment that is indicative of malicious process creation.

After logging in to the first device, user1 initiates a number of processes, whose associated events are logged as event data by a security platform, in this instance, AD. The LM security application, based on the analysis of the AD log file, creates feature vector F2 of node D702, which is indicative of a malicious process creation. FIGS. 10A-C are an example of an event segment that is indicative of malicious process creation. The LM security application detects that user1 next logs into a second device, and the LM security application creates node D703 to represent the second device, and creates F1 of node D703 to indicate the user1 login. The LM security application detects that, at a time later than user1 logging into the second device, a second user, user2, logs in to the second device. The LM security application creates node U704 to represent the user2 account, and creates F1 of node U704 to indicate the user2 login.

The LM security application detects that, after logging into the second device, user1 via a firewall device downloads an application to the second device. The LM security application creates node A706 to represent the application, and creates node FD707 to represent the firewall device. F1 of node A706 is created to indicate that user1 installed the application, F1 of node FD707 is created to indicate that the second device accessed an Internet Protocol (IP) address at an untrusted network via the firewall device, and F2 of node D703 is created to indicate that the application was downloaded to the second device. The LM security application continues with its analysis of the event data until it has completed the creation of the graph, at which point the graph is ready for subsequent analysis. The subsequent analysis can include extracting paths from the graph, which are a sequence of nodes. An example of a path is U701→D702, D703, U704. A second example of a path is D702→D703→A706.

Figure 11:
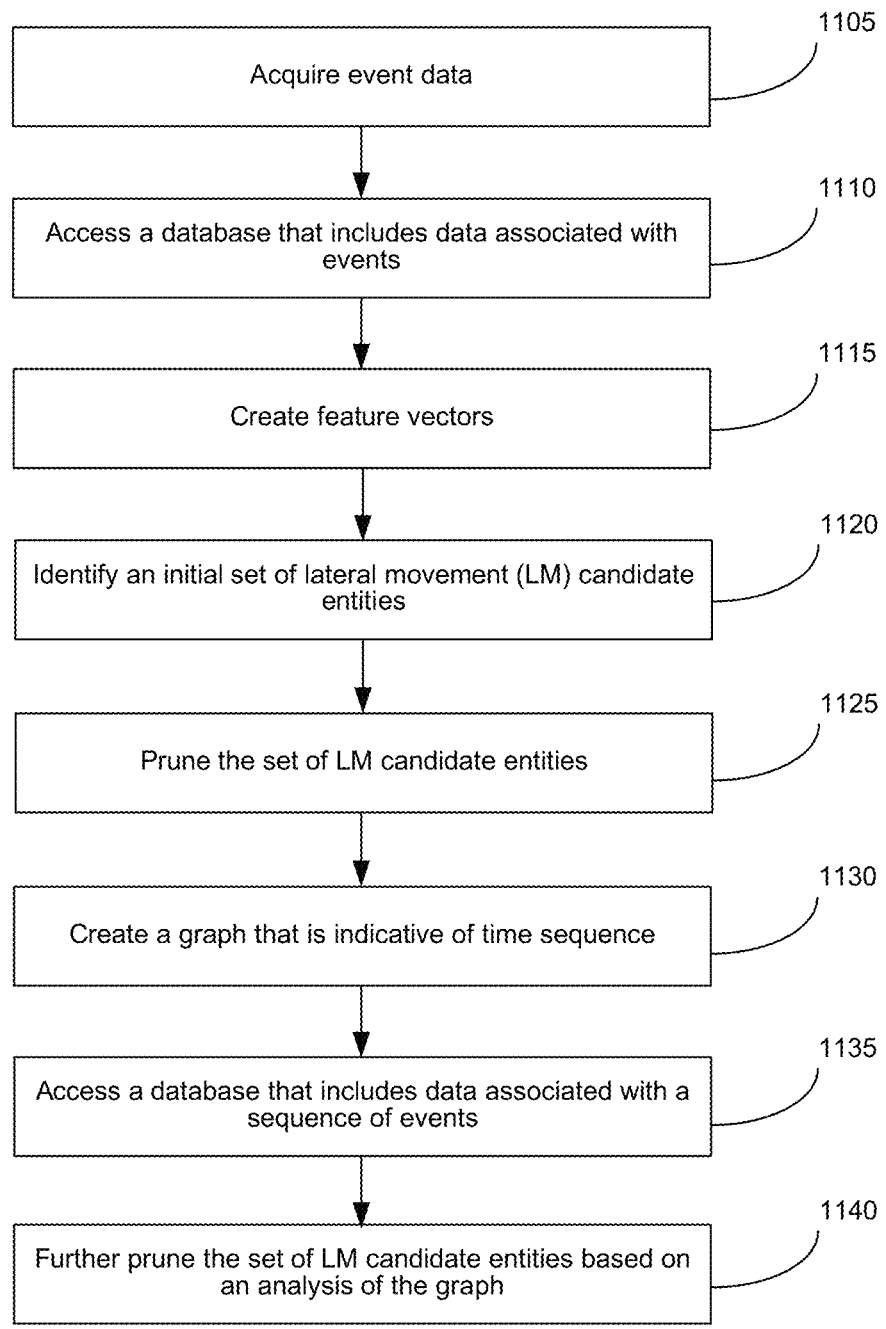
FIG. 11 is a flow diagram illustrating a method for pruning a set of lateral movement candidate entities.

FIG. 11 is a flow diagram illustrating a method for identifying lateral movement candidate entities. At block 1105, a LM security application executing on a processing system, such as processing device 1200 of FIG. 12, acquires event data. The acquisition of the event data can be real time, such as by receiving streamed event data from a security platform(s), or can be non-real time, such as via a cron job that runs periodically and that accesses log file(s) that include event data of a security platform(s). The acquired event data can be the event data from a certain period of time, such as the last thirty days. For example, a log file can include event data over the past sixty days, and the LM security application can acquire a subset of the event data (e.g., event data from the past thirty days, all the event data, etc.). The event data can be generated by any of various security platforms, such as a directory service, a firewall (software or hardware based), an endpoint application, etc.

At block 1110, the LM security application accesses a data store that includes data associated with events that indicate LM or a LM candidate(s). The data associated with the events can include any of event data associated with the events, event segments derived from the event data, feature vectors derived from the event segments, etc., and which indicate LM or a LM candidate(s). An event segment includes event data from one or more events, and is generated based on specific event parameters and selected event attributes. A feature vector is a representation of an event segment, and can include the event data of an event segment, or data that represents or is derived from the event data of the event segment. In some embodiments, a feature vector includes representations of the event data of the event segment, such as: a numeric value that represents a certain set of events; a list of events, each with an associated binary value that indicates whether the event is present; a list of events, each with an associated value (e.g., 0, 1, 100) that indicates how many times the event is present, etc. Some or all of the event-related data of the data store (i.e., stored event-related data) additionally include a weight factor that represents a weight that can be applied to the stored event-related data. Further, a dynamic weight factor can be applied to the stored event-related data, such as a weight factor that is dynamically determined based on a characteristic(s) or the stored event-related data or an associated entity(ies), such as based on a collection of features happening at a similar time. The data store includes stored event-related data that indicate LM or a LM candidate(s), and can further include stored event-related data that indicate unlikely LM or LM candidate(s).

Event segments can indicate LM or a LM candidate in any of various ways. The following is a list of characteristics or features of an event segment, which may indicate LM or a LM candidate.

Suspicious—the event segment is indicative of a suspicious activity.

Rare—a statistical approach determines if an event segment is indicative of a rare event, whether an entity associated with an event segment has a rare name, whether an operating system process associated with an event segment is rare, etc. An event is rare, for example, if it occurs below a certain threshold, such as once in a million events.

Blacklisted—the event segment is indicative of an application, operating system process, etc. that is blacklisted. The LM security application can check the application, operating system process, etc. against a data store of blacklisted components, which are components that have been determined to pose a security risk.

Anomalous—the event segment is indicative of an anomalous event, such as, as determined by an analyzer.

Privilege Elevation—the event segment is indicative of a user account being assigned a new privilege level, such as being assigned the levels SeTcbPrivilege or SeDebugPrivilege as reported by AD event id 4672.

User Enumeration—the event segment is indicative of a user enumeration attack, such as when a source (e.g., a user account or other entity) tries to identify (e.g., by means of brute force trial-and-error) names of other users and their passwords.

Network Enumeration—the event segment indicates that a source user or device entity tries to scan network ports (e.g., as indicated by sending a small number of packets to each port, by scanning the ports in a specific sequence, etc.). This data can come from, e.g., a firewall log file.

Expanding Access—the event segment is indicative of a user entity(ies) that accesses an increasing number of devices/shares/etc. over time.

Security Violation—the event segment is indicative of a user entity(ies) that violates enterprise security GPO (Group Policy Objects), use plain text passwords, have login failures with unusual return codes (logging messages), etc.

Suspicious Security Practices—the event segment is indicative of a user entity(ies) that add or delete users or device accounts frequently from security a enabled/disabled group(s).

Ratio—the event segment is indicative of a user entity(ies) with a high number of operating system process creation activities, or with a higher number of login failures (as compared to the user's history or peer groups).

Suspicious Tasks—the event segment is indicative of a user or device that executes tasks not seen before, users with local/domain admin credentials doing a specific suspicious activity, such as a shadow copy of AD data.

Anomaly Analytics—the event segment is indicative of a user/device/application entity(ies) exhibiting an anomaly: This is a composite feature comprising of: (1) Max and Median scores of all anomalies attributed to an entity, and (2) a count of all LM-related anomalies attributed to an entity Peer Group Checks—the event segment is indicative of a component (e.g., event, network-related activity, etc.) that occurs more often for an entity than for a peer group of the entity.

The LM security application analyzes the event data to extract event segments, which are event data of one or more corresponding events. FIGS. 8A-C provide one example of an event segment derived from an AD log file. Event segments can be extracted via any of a number of methods, one such method being discussed in U.S. patent application Ser. No. 15/478,186, filed Apr. 3, 2017, which is incorporated by reference herein in its entirety. An event segment can be associated with one or more entities. The LM security application accesses the data store to identify stored event-related data that correspond to event segments acquired at block 1105. In an example where the data store includes feature vectors, the LM security application creates feature vectors (block 1115) based on the event data, and associates the feature vectors with network entities based on the event data. The LM security application then accesses the data store to determine if there are any network entities that correspond to a selected feature vector.

In some embodiments, the data store includes feature vectors that were previously determined based on LM experiments performed in a test environment in a laboratory. In the experiments, LM was injected into the test environment and event data was monitored, and feature vectors that indicated LM in the test environment, or feature vectors that indicated no LM in the test environment, were identified and added to the data store as LM indicators or LM contra-indicators. When corresponding event-related data is found, and where the event-related data is indicative of LM or a LM candidate, the LM security application can identify the entity(ies) associated with the feature vector as being a LM candidate(s). Conversely, when corresponding event-related data is found, and where the event-related data is indicative of non-LM or a non-LM candidate, the LM security application can identify the entity(ies) associated with the feature vector as not being a LM candidate(s).

At block 1120, the LM security application identifies an initial set of LM candidate entities. In an example where the data store includes feature vectors, the initial set of entities are those entities that are associated with feature vectors for which the LM security application finds corresponding event-related data in the data store, and where the event-related data is indicative of LM or a LM candidate. In another example where the data store includes feature vectors, the initial set of LM candidate entities are those entities that score above a predetermined threshold. For a given entity with a set of associated feature vectors, in some embodiments, the entity's score is determined by, for each of the set of feature vectors for which the LM security application finds corresponding event-related data in the data store, and where the event-related data is indicative of LM or a LM candidate, adding the weight of the feature vector to a feature vector weight sum for the entity. In other embodiments, each entity has an associated weight, such as a weight that is based on the criticality of the entity. Entities that have a critical role, such as database server devices, network directory service devices, security monitoring applications, network administrators, etc., may have higher weights than other, less critical entities. The feature vector sum for the entity is multiplied by the weight that is indicative of the criticality of the entity.

In yet another example, the data store includes other data, such as event segments or other data derived from event segments. In this example, the initial set of LM candidate entities are similarly those entities for which the LM security application finds corresponding event-related data in the data store, and where the event-related data is indicative of LM or a LM candidate, or are those entities that score above a predetermined threshold.

In some embodiments, at block 1125, the LM security application prunes the set of LM candidate entities. The set of LM candidate entities can be pruned in any of various ways. In an example, the data store includes feature vectors. When the LM security application finds corresponding event-related data in the data store, and where the event-related data is indicative of an unlikely LM or LM candidate, the entity associated with the particular feature vector may be pruned from the set of LM candidate entities, or the particular feature vector may be pruned from the entity. In some embodiments, the entity associated with the particular feature vector or the particular feature vector is always pruned. In other embodiments, the entity associated with the particular feature vector is pruned based on criteria. Examples of criteria include: the feature vector weight sum for the entity; how many feature vectors associated with the entity that have corresponding event-related data in the data store that indicate an unlikely LM or LM candidate; the weights of the feature vectors associated with the entity that have corresponding event-related data in the data store that indicate an unlikely LM or LM candidate; characteristics of the entity (e.g., an entity that performs a suspicious activity, such as contacting all devices in a company, is pruned from the set of LM candidates when the entity executes a corporate anti-virus application), etc.

In another example, the data store similarly includes feature vectors. The LM security application determines a peer group for an LM candidate entity, and compares a suspicious feature vector of the entity with a similar feature vector(s) of the peer group. When the comparison indicates that occurrences of the suspicious feature vector are similarly to occurrences of the similar feature vector(s) of the peer group, the LM security application may prune the entity from the LM candidate entities, or may prune the suspicious feature vector from the entity. In some embodiments, the entity associated with the suspicious feature vector is always pruned. In other embodiments, the entity associated with the suspicious feature vector is pruned based on criteria. Examples of criteria include: the feature vector weight sum for the entity; how many feature vectors associated with the entity that have corresponding event-related data in the data store that indicate an unlikely LM or LM candidate; the weights of the feature vectors associated with the entity that have corresponding event-related data in the data store that indicate an unlikely LM or LM candidate; characteristics of the entity, etc. In some embodiments, the LM security application can determine a weight factor for each entity, such as based on characteristics of the entity.

In yet another example, the LM security application clusters the LM candidate entities. A cluster is a grouping of entities based on any of various characteristic(s) or feature(s). In an example, a cluster of entities is identified by selecting those entities that send or receive a certain type of traffic through a firewall. In another example, a cluster of entities is identified based on a feature, such as based on analysis of computer code, based on a reference to an entity, group of entities, type of entity, etc. in the computer code, among others. In yet another example, a cluster of entities is identified based on an access of a Human Resources database, such as based on entities associated with executives whose identities are obtained based on an access of a Human Resources database. In another example, a cluster of entities is identified based on data of an IP packet(s). The feature(s)/characteristics(s) can include feature vectors, event data, other data derived from event segments, and the like. The current feature vectors of an entity may be the original feature vectors, or may be a pruned set of feature vectors (e.g., pruned as discussed above). When the LM security application determines that a particular cluster of entities is not suspicious, the entities of the particular cluster can be pruned from the LM candidate entities. In another example, the weights of the entities of a cluster can be changed. For example, when a particular cluster of entities is determined to be less suspicious, the weights of the entities can be dynamically reduced, or when a particular cluster of entities is determined to be more suspicious, the weights of the entities can be dynamically increased, etc.

At block 1130, the LM security application creates a graph that is indicative of time sequence. The graph can be the graph of FIG. 7, some appropriate variant, etc., and can be implemented as, for example, a data structure, or via any other appropriate method/form. In some embodiments, the graph discussed in the description of FIG. 11 is different from graphs discussed elsewhere in the specification, such as in the descriptions of FIGS. 2-6. The event data include time-related data, such as timestamp data, which enables some or all of the event data to be time sequenced. The LM security application analyzes the timestamp data to sequence the event data, and creates a data structure which represents an associated graph. The graph includes nodes and connections between nodes, also referred to as edges. Each node of the graph represents an entity, and each edge represents a login or a sequence of events/event segments that can associate one entity to another entity. A sequence of events/event segments can include, e.g., just one event/event segment. Each node can have one or more associated feature vectors or other data derived from event segments. In some embodiments, the graph includes data that represents the time sequence of some or all of the feature vectors or other data derived from event segments.

The feature vector(s) that are associated with a particular entity are associated by the LM security application with a node of the graph that represents the particular entity. In some embodiments, an entity may be represented by multiple nodes, with a first node representing an activity(ies) that occur during a first time period, and a second node representing an activity(ies) that occur during a second time period. The feature vector(s) that represent an activity(ies) that occur during the first time period are associated the first node, and those that represent an activity(ies) that occur during the second time period are associated with the second node.

At block 1135, the LM security application accesses a data store that includes data associated with a sequence of events that indicate LM or a LM candidate(s). The data associated with a sequence of events, also referred to as a macro, can be data derived from any of event data associated with a sequence of events, event segments derived from the event data, feature vectors derived from the event segments, event data/segments associated with a path, etc. In an example, a data store includes macros where each of the macros is stored in a data store and defines a sequence of nodes or node types (e.g., a user device, an AD store device, etc.) and associated events, event segments, or feature vectors. A macro may be stored in a data store as an entry (i.e., a "data store entry"), or in any other usable manner. In some embodiments, the data store includes the time sequence of some or all of the associated events, event segments, or feature vectors. The data store entry may additionally include, for each data store entry, for each node of a data store entry, for each event-related datum or set of event-related data, etc., a weight factor that represents a weight that can be applied to a corresponding node(s). The data store includes stored event-related data that indicate LM or LM candidates, and can further include stored event-related data that indicate unlikely LM or LM candidates.

Node sequences/paths can indicate LM or a LM candidate(s) in any of various ways. For example, a feature vector that is indicative of a suspicious application associated with a user, followed by a feature vector that is indicative of a privilege elevation of the user, followed by a feature vector that is indicative of user enumeration. As another example, a feature vector that is indicative of a suspicious application associated with a user, followed by a feature vector that is indicative of a privilege elevation of the user, followed by a feature vector that is indicative of a login to another device. In yet another example, feature vectors are associated with some or all of time 1-time 5, with each time being after the previous time (e.g., time 2 is after time 1, time 3 is after time 2, etc.). A node sequence includes a feature vector that is indicative of a blacklisted process at the first time, a feature vector that is indicative of a privilege elevation at the second time, a feature vector that is indicative of an enumeration at a time interval bounded by the second time and the fifth time, and three feature vectors, the first of which is indicative of an anomaly at time 1, the second of which is indicative of an anomaly at time 3, and the third of which is indicative of an anomaly at time 4. Macros that indicate components or phases of an attack can be grouped to indicate further/larger phases of an attack or even an entire attack, and weights associated, via the data store, with the macros or the nodes of the macros can be increased when an entire attack is detected.

At block 1140, the LM security application further prunes the set of LM candidate entities based on an analysis of the graph. The set of entities can be pruned in any of various ways based on any of various analyses of the graph. In an example, the graph includes nodes and edges, each node has one or more associated feature vectors and an associated criticality weight, each edge represents a time sequences between two nodes, and the feature vectors include data that enables determination of a time sequence between any two feature vectors and include an associated weight. The LM security application, based on a set of rules, extracts a node sequence, which can also be a path, from the graph, and searches for a corresponding node sequence in a data store that includes node sequences (i.e., a node sequence data store, which can also be a path data store). The node sequence data store includes, for all nodes of each data store entry, a weight factor that represents a weight that can be applied to a corresponding node of a graph.

When the LM security application finds a data store entry that corresponds to the node sequence from the graph (e.g., by corresponding to a path in the graph that involves nodes of the node sequence), and the node sequence is indicative of LM or a LM candidate entity(ies), the LM security application acquires from the node sequence data store the weight, also called the node weight, that corresponds to each node of the data store entry, and associates each node weight with a node from the graph that corresponds to the node of the data store entry with which the node weight is associated. After completing this process all the node sequences extracted from the graph, the LM security application calculates a score for each node of the graph, and prunes all nodes below a certain threshold from the set of LM candidate entities. In an example, the LM security application sums the weights for all the feature vectors for a given node, multiplies the feature vector weight sum by the critical weight associated with the node, and then multiplies that product by a sum of all node weights associated with the given node.

In some embodiments, the LM security application may search the data store for and find a combination of node sequences extracted from the graph that match a combination of stored event-related data that indicate LM or a LM candidate entity(ies). For example, each node sequence of a combination of node sequences may indicate a certain phase of an attack, and matching the combination of node sequences may indicate an entire attack. In such a case, additional weight factors may be applied to the nodes of the matched combination of node sequences.

In another example, the graph once again includes nodes and edges, each node has one or more associated feature vectors and an associated criticality weight, each edge represents a time sequences between two nodes, and the feature vectors include data that enables determination of a time sequence between any two feature vectors, and include a weight. The LM security application extracts a node sequence from the graph, and searches for a corresponding node sequence in a node sequence data store. The node sequence data store includes, for all nodes of each data store entry, a weight factor that represents a node weight that can be applied to a corresponding node of a graph.

When the LM security application finds a data store entry that corresponds to the node sequence from the graph, and the node sequence is indicative of LM or a LM candidate entity(ies), the LM security application calculates a path value of the node sequence, or path. If the path value is above a certain threshold, the nodes of the path remain as LM candidate entities. If this path value, and the path values of all the other paths that include a given node of the path are below a certain threshold, the given node is pruned from the set of LM candidate entities. A path value is determined by summing the scores for each node of a path, where the score of each node is determined as in the above example.

In yet another example, the graph once again includes nodes and edges, each node has one or more associated feature vectors and an associated criticality weight, each edge represents a time sequences between two nodes, and the feature vectors include data that enables determination of a time sequence between any two feature vectors, and include a weight. The LM security application extracts a node sequence from the graph, and searches for a corresponding node sequence in a node sequence data store. The node sequence data store includes, for all nodes of each data store entry, a weight factor that represents a node weight that can be applied to a corresponding node of a graph.

When the LM security application finds a data store entry that corresponds to the node sequence from the graph, and the node sequence is indicative of an unlikely LM or LM candidate entity(ies), the LM security application may prune any or all of the entities of the node sequence from the set of LM candidate entities. In some embodiments, all the entities associated with the node sequence are pruned. In other embodiments, some or all of the entities associated with the node sequence are pruned based on criteria. Examples of criteria include: the feature vector weight sums for each entity; the score for the path value; characteristics of one or more of the entities of the node sequence (e.g., nodes of a node sequence that includes an entity that performs a suspicious activity, such as contacting all devices in a company, is pruned from the set of LM candidates when the entity executes a corporate anti-virus application), etc. As should be apparent from the above discussion, there are many ways to create and analyze the graph, and to prune the set of the entities based on the analysis of the graph.

FIG. 12 is a block diagram illustrating an example of a processing system in which at least some operations described herein can be implemented. Processing device 1200 can represent any of the devices described above, e.g., AD Store 111, AD Domain Controllers 112-113, Endpoint Devices 115-116, Security System 118, File Server 117, Firewall 160, a security platform, etc. Any of these systems can include two or more processing devices, as is represented in FIG. 12, which can be coupled to each other via a network or multiple networks.

In the illustrated embodiment, the processing device 1200 includes one or more processors 1210, memory 1211, a communication device 1212, and one or more input/output (I/O) devices 1213, all coupled to each other through an interconnect 1214. The interconnect 1214 may be or include one or more conductive traces, buses, point-to-point connections, controllers, adapters and/or other conventional connection devices. The processor(s) 1210 may be or include, for example, one or more general-purpose programmable microprocessors, microcontrollers, application specific integrated circuits (ASICs), programmable gate arrays, or the like, or any combination of such devices. The processor(s) 1210 control the overall operation of the processing device 1200. Memory 1211 may be or include one or more physical storage devices, which may be in the form of random access memory (RAM), read-only memory (ROM) (which may be erasable and programmable), flash memory, miniature hard disk drive, or other suitable type of storage device, or any combination of such devices. Memory 1211 may store data and instructions that configure the processor(s) 1210 to execute operations in accordance with the techniques described above. The communication device 1212 may be or include, for example, an Ethernet adapter, cable modem, Wi-Fi adapter, cellular transceiver, Zigbee transceiver, Bluetooth transceiver, or the like, or any combination thereof. Depending on the specific nature and purpose of the processing device 1200, the I/O devices 1213 can include various devices, e.g., a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by any combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method, comprising:
   accessing, by a computer system, event data indicative of a plurality of events related to a plurality of entities associated with a network;
   identifying, by the computer system, based on the event data, lateral movement candidate entities by identifying a subset of the plurality of entities as being associated with particular events that indicate lateral movement in the network;
   creating, by the computer system, based on the event data, a graph data structure that is indicative of a sequence of events associated with the lateral movement candidate entities, wherein the graph data structure includes a plurality of nodes and one or more connections between the nodes, each of the nodes represents an entity of the plurality of entities and is associated, via the graph data structure, with a feature vector that is derived from a set of events that are associated with the node, and a connection from a first node to a second node in the graph data structure represents a sequence of events in the plurality of events; and analyzing, by the computer system, the graph data structure to identify a potential security threat by identifying a subset of the lateral movement candidate entities that are associated with a particular sequence of events.

2. The method of claim 1, wherein each entity of the plurality of entities is a user account, a computing device, or an application, and wherein the graph data structure represents a time constrained graph.

3. The method of claim 1, wherein the sequence of events includes a first event associated with the first node that occurred before a second event associated with the second node, wherein a connection from the first node to the second node in the graph data structure represents a determination that the first event occurred before the second event, and wherein the first event and the second event are part of the particular sequence of events.

4. The method of claim 1, wherein the event data include data obtained from a log file generated by a security platform, and wherein the security platform is any of Active Directory, a firewall, or an endpoint application.

5. The method of claim 1, wherein the event data include data obtained from a log file generated by a security platform, wherein the security platform is any of Active Directory, a firewall, an endpoint application, or an application that generates event data, wherein the event data is streamed by a security platform, and wherein the event data is accessed by receiving the streamed event data.

6. The method of claim 1, wherein the identifying the lateral movement candidate entities includes:

accessing a data store that includes data associated with selected events, wherein the selected events are indicative of lateral movement;

determining, based on the data store access, that the selected events include the particular events that indicate lateral movement;

determining which of the plurality of entities are associated with the particular events to determine the subset of the plurality of entities, the subset of the plurality of entities being lateral movement candidate entities; and identifying each entity in the subset of the entities as being a lateral movement candidate entity.

7. The method of claim 1, wherein the identifying the lateral movement candidate entities includes:

accessing a data store that includes data associated with selected events, wherein each selected event of the selected events is included in the data store after a determination has been made that the selected event is indicative of lateral movement, and wherein the identifying the subset of the plurality of entities includes based on the event data includes identifying an entity of the subset of the plurality of entities based on an anomaly.

8. The method of claim 1, wherein the identifying the lateral movement candidate entities includes:

accessing a data store that includes data associated with selected events, wherein the selected events are indicative of lateral movement, and wherein each of the selected events has an associated weight factor; and for each entity of the plurality of entities:

identifying a subset of the event data that is associated with the entity;

obtaining, based on the data store access, a weight factor for each event of the subset of event data;

calculating an entity weight factor for the entity based on the weight factor for each event;

when the entity weight factor is above a threshold, including the entity in the subset of the plurality of entities that are lateral movement candidate entities.

9. The method of claim 1, wherein the creating the graph data structure that is indicative of the sequence of events includes:

associating data with a node of the graph data structure, wherein the data is derived from a subset of the event data associated with the node;

analyzing the event data to determine the sequence of events; and creating connections between the nodes to represent the sequence of events.

10. The method of claim 1, wherein the creating the graph data structure that is indicative of the sequence of events includes:

for each entity of the plurality of entities:

creating a node in a data structure to represent the entity;

identifying a subset of the event data that are associated with the node;

creating a feature vector that is derived from the subset of the event data; and associating the feature vector with the node;

analyzing the event data to determine the sequence of events; and creating connections between the nodes to represent the sequence of events.

11. The method of claim 1, wherein the creating the graph data structure that is indicative of the sequence of events includes:

associating one or more feature vectors with a node that represents an entity, wherein each of the one or more feature vectors is derived from the subset of the event data and has an associated weight factor;

creating connections between the node and other nodes to represent the sequence of events; and calculating a path value for a path based on entity and feature weight factors.

12. The method of claim 1, wherein the analyzing the graph data structure to identify the potential security threat includes:

accessing a data store that includes data associated with a plurality of sequences of events, wherein the data store includes a sequence weight factor for a particular sequence of events; and identifying one or more entities that are associated with a particular sequence of events as being the subset of the lateral movement candidate entities based on the sequence weight factor associated with the particular sequence.

13. The method of claim 1, wherein the analyzing the graph data structure to identify the potential security threat includes:

accessing a data store that includes data associated with a plurality of sequences of events, wherein each of the sequences of events is indicative of lateral movement;

determining, based on the data store access, that the sequences of events include the particular sequence of events; and identifying the subset of lateral movement candidate entities by determining which of the plurality of entities are associated with the particular sequence of events.

14. The method of claim 1, wherein the analyzing the graph data structure to identify the potential security threat includes:
   accessing a data store that includes data associated with a plurality of sequences of events, wherein each of the sequences of events is indicative of lateral movement;
   determining, based on the data store access, that the sequences of events include the particular sequence of events; and
   identifying the subset of lateral movement candidate entities by determining which of the plurality of entities are associated with the particular sequence of events, wherein each sequence of the plurality of sequences of events was included in the data store after a determination was made that the sequence is indicative of lateral movement.

15. The method of claim 1, wherein the analyzing the graph data structure to identify the potential security threat includes determining which of the plurality of entities are the lateral movement candidate entities after a determination was made that a particular subset of the entities is associated with a particular set of feature vectors that are associated with the particular sequence of network events.

16. The method of claim 1, wherein the identifying the lateral movement candidate entities includes identifying a particular entity as being a lateral movement candidate entity based on a determination that a particular event associated with the particular entity is one of the following types of events:
   an event that meets a requirement for being classified as a rare event,
   an event that is indicative of a blacklisted application or process,
   an event that is indicative of a user enumeration attack,
   an event that is indicative of an anomalous event,
   an event that is indicative of a privilege elevation,
   an event that is indicative of a security violation,
   an event that is indicative of a suspicious task,
   an event that is indicative of a number of process creation events above a predetermined threshold,
   an event that is indicative of a number of ports scanned above a predetermined threshold,
   an event that is indicate of expanding access,
   an event that is indicative of a shadow copy of Active Directory data,
   an event that is indicative of suspicious activity, or
   an event that is indicative of a suspicious login chain.

17. The method of claim 1, wherein the identifying the lateral movement candidate entities includes identifying a particular entity as being a lateral movement candidate entity based on a determination that a particular event associated with the particular entity is indicative of a shadow copy of Active Directory data, and wherein the particular event comprises a plurality of events.

18. The method of claim 1, wherein the identifying the lateral movement candidate entities includes identifying a particular entity as being a lateral movement candidate entity based on a determination that a particular event associated with the particular entity is an event that meets a requirement for being classified as a rare event, and wherein the requirement for a particular event being classified as a rare event is that the particular event occurs with a frequency below a predetermined threshold.

19. The method of claim 1, wherein the identifying the lateral movement candidate entities includes identifying a particular entity as being a lateral movement candidate entity based on a determination that a particular event associated with the particular entity is an event that is indicative of a blacklisted application or process, and wherein the particular event is indicative of a blacklisted application or process when the particular event is associated with an application or process that is included in a data store of blacklisted applications or processes.

20. The method of claim 1, wherein the particular sequence of events includes a first event that is indicative of a privilege elevation associated with a user account, and a second event that is indicative of a login associated with the user account.

21. The method of claim 1, wherein the identifying the lateral movement candidate entities includes identifying a particular entity as being a lateral movement candidate entity based on a determination that a particular event associated with the particular entity is an event that is indicative of a suspicious login chain.

22. The method of claim 1, wherein the identifying the lateral movement candidate entities includes identifying a particular entity as being a lateral movement candidate entity based on a determination that a particular event associated with the particular entity is an event that is indicative of a privilege elevation.

23. The method of claim 1, further comprising:
   analyzing the graph data structure to determine that a particular event is unlikely to represent a security threat; and
   removing a particular entity from the lateral movement candidate entities based on the particular event being identified as being unlikely to represent a security threat.

24. The method of claim 1, wherein the identifying the lateral movement candidate entities includes identifying a particular entity as being a lateral movement candidate entity based on a determination that a particular event associated with the particular entity is an event that is indicative of a user enumeration attack.

25. The method of claim 1, wherein the identifying the lateral movement candidate entities includes identifying a particular entity as being a lateral movement candidate entity based on a determination that a particular event associated with the particular entity is an event that is indicative of a number of process creation events above a predetermined threshold.

26. The method of claim 1, wherein the identifying the lateral movement candidate entities includes identifying a particular entity as being a lateral movement candidate entity based on a determination that a particular event associated with the particular entity is an event that is indicative of a number of ports scanned above a predetermined threshold.

27. A computing device, comprising:
   a processor; and
   a memory storing instructions that, when executed by the processor, cause the processor to perform a process including:
      accessing event data indicative of a plurality of events related to a plurality of entities associated with a network;
      identifying, based on the event data, lateral movement candidate entities by identifying a subset of the plurality of entities as being associated with particular events that indicate lateral movement in the network;
      creating, based on the event data, a graph data structure that is indicative of a sequence of events associated with the lateral movement candidate entities, wherein the graph data structure includes a plurality of nodes and one or more connections between the nodes, each of the nodes represents an entity of the plurality of entities and is associated, via the graph data structure, with a feature vector that is derived from a set of events that are associated with the node, and a connection from a first node to a second node in the graph data structure represents a sequence of events in the plurality of events; and analyzing, the graph data structure to identify a potential security threat by identifying a subset of the lateral movement candidate entities that are associated with a particular sequence of events.

28. A non-transitory machine-readable storage medium storing instructions which, when executed by at least one processor, cause the at least one processor to perform operations, comprising:

accessing event data indicative of a plurality of events related to a plurality of entities associated with a network;

identifying, based on the event data, lateral movement candidate entities by identifying a subset of the plurality of entities as being associated with particular events that indicate lateral movement in the network;

creating, based on the event data, a graph data structure that is indicative of a sequence of events associated with the lateral movement candidate entities, wherein the graph data structure includes a plurality of nodes and one or more connections between the nodes, each of the nodes represents an entity of the plurality of entities and is associated, via the graph data structure, with a feature vector that is derived from a set of events that are associated with the node, and a connection from a first node to a second node in the graph data structure represents a sequence of events in the plurality of events; and analyzing, the graph data structure to identify a potential security threat by identifying a subset of the lateral movement candidate entities that are associated with a particular sequence of events.

* * * * *